US008434676B2

(12) United States Patent
Sekiguchi et al.

(10) Patent No.: US 8,434,676 B2
(45) Date of Patent: May 7, 2013

(54) BANKNOTE HANDLING SYSTEM

(75) Inventors: Junichi Sekiguchi, Himeji (JP); Shinji Matsumoto, Himeji (JP); Mitsuhiro Takagi, Himeji (JP); Mikio Wada, Kakogawa (JP); Shigeo Matsumoto, Himeji (JP); Hirofumi Masuki, Takasago (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 0 days.

(21) Appl. No.: 12/737,569

(22) PCT Filed: Jul. 28, 2009

(86) PCT No.: PCT/JP2009/063395

§ 371 (c)(1),
(2), (4) Date: May 19, 2011

(87) PCT Pub. No.: WO2010/013694

PCT Pub. Date: Feb. 4, 2010

(65) Prior Publication Data

US 2011/0235893 A1 Sep. 29, 2011

(30) Foreign Application Priority Data

Jul. 28, 2008 (JP) ................................ 2008-193135
Jul. 28, 2008 (JP) ................................ 2008-193138
Jul. 28, 2008 (JP) ................................ 2008-193141

(51) Int. Cl.
*G06F 17/60* (2006.01)

(52) U.S. Cl.
USPC .......................................... 235/379; 235/380

(58) Field of Classification Search .................. 235/379, 235/380, 383
See application file for complete search history.

(56) References Cited

U.S. PATENT DOCUMENTS 5,909,814 A 6/1999 Arikawa
7,455,219 B2 * 11/2008 Langlotz et al. .............. 235/379

(Continued)

FOREIGN PATENT DOCUMENTS

JP 63-168570 11/1988
JP 1-42213 12/1989
JP 2002-362827 12/2002

OTHER PUBLICATIONS

Chinese Office Action (Chinese Patent Application No. 2009801297169) with English Translation (English Translation 20 pages and Chinese Office Action 7 pages—dated Oct. 12, 2012).

*Primary Examiner* — Daniel St. Cyr
(74) *Attorney, Agent, or Firm* — Renner, Kenner, Greive, Bobak, Taylor & Weber

(57) ABSTRACT

There is provided a banknote handling system including: a reception unit configured to receive a banknote that has been put therein; a recognition unit configured to recognize the banknote that has been received by the reception unit; a storing unit having at least one first cassette configured to store or escrow the banknote that has been recognized by the recognition unit, and at least one second cassette configured to store the banknote that has been recognized by the recognition unit; an operation unit configured to receive a deposit-confirmation instruction for the banknote that has been escrowed in the first cassette; and a control unit configured to cause the banknote that has been recognized by the recognition unit to be escrowed in the first cassette and to cause, when the deposit-confirmation instruction is received by the operation unit, the banknote that has been escrowed in the first cassette to be stored in the second cassette.

23 Claims, 27 Drawing Sheets

U.S. PATENT DOCUMENTS 8,087,581 B2 * 1/2012 Utsumi et al. ................ 235/379
8,162,308 B2 * 4/2012 Kobayashi et al. ............. 270/60
8,196,916 B2 * 6/2012 Yanagida et al. ............ 271/3.14
2007/0229253 A1 10/2007 Langlotz et al.

* cited by examiner

2101B

| NO. | RECOGNITION RESULT |
|---|---|
| 1 | THOUSAND |
| 2 | TWO THOUSAND |
| 3 | FIVE THOUSAND |
| 4 | REJECT (TRANSPORT ERROR) |
| 5 | TEN THOUSAND |

F I G. 23

2101C

| DENOMINATION | THE NUMBER OF BANKNOTES |
|---|---|
| THOUSAND | 2700 |
| TWO THOUSAND | 100 |
| FIVE THOUSAND | 500 |
| TEN THOUSAND | 1000 |

F I G. 24

2101D

| CASSETTE 2131 | | CASSETTE 2132 | | CASSETTE 2133 | |
|---|---|---|---|---|---|
| DENOMINATION | THE NUMBER OF BANKNOTES | DENOMINATION | THE NUMBER OF BANKNOTES | DENOMINATION | THE NUMBER OF BANKNOTES |
| THOUSAND | 2600 | THOUSAND | 0 | THOUSAND | 0 |
| TWO THOUSAND | 100 | TWO THOUSAND | 0 | TWO THOUSAND | 0 |
| FIVE THOUSAND | 0 | FIVE THOUSAND | 400 | FIVE THOUSAND | 0 |
| TEN THOUSAND | 0 | TEN THOUSAND | 0 | TEN THOUSAND | 900 |

F I G. 25

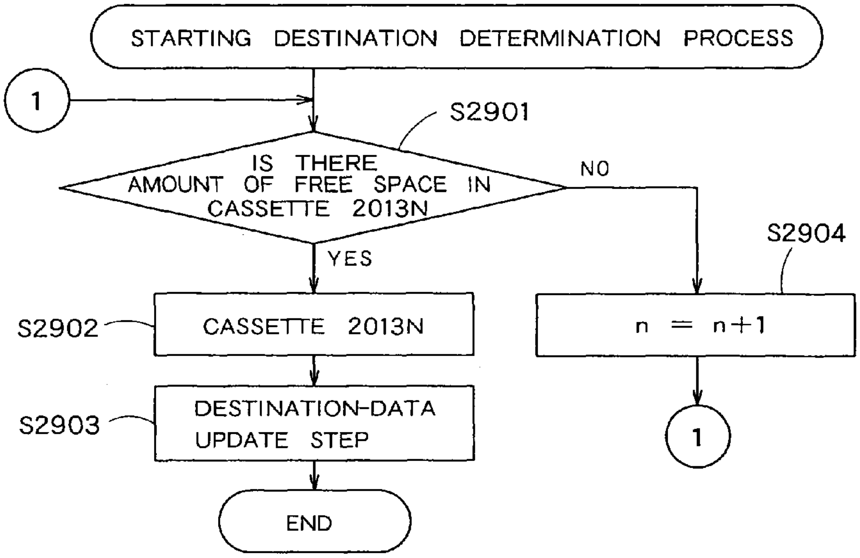

FIG. 29

| CASSETTE 2131 | | CASSETTE 2132 | | CASSETTE 2133 | |
|---|---|---|---|---|---|
| DENOMINATION | THE NUMBER OF BANKNOTES | DENOMINATION | THE NUMBER OF BANKNOTES | DENOMINATION | THE NUMBER OF BANKNOTES |
| THOUSAND | 100 | THOUSAND | 0 | THOUSAND | 0 |
| TWO THOUSAND | 0 | TWO THOUSAND | 0 | TWO THOUSAND | 0 |
| FIVE THOUSAND | 50 | FIVE THOUSAND | 50 | FIVE THOUSAND | 0 |
| TEN THOUSAND | 50 | TEN THOUSAND | 0 | TEN THOUSAND | 0 |

2101E

FIG. 30

| DENOMINATION | THE NUMBER OF BANKNOTES |
|---|---|
| THOUSAND | 0 |
| TWO THOUSAND | 0 |
| FIVE THOUSAND | 0 |
| TEN THOUSAND | 50 |

2101F

FIG. 31

BANKNOTE HANDLING SYSTEM

FIELD OF THE INVENTION

The present invention relates to a banknote handling system. In particular, the present invention relates to a banknote handling system used for a deposit process.

BACKGROUND ART

Conventional banknote handling systems used for a deposit process are configured to: escrow banknotes, which have been deposited through an inlet thereof, in an escrow unit thereof; feed the banknotes escrowed in the escrow unit; and store the fed banknotes in a storing unit thereof. As examples of this type of banknote handling system, there are known banknote handling systems that have been disclosed in JP 10-283524 and JP 8-7146. In each of the banknote handling systems that have been disclosed in these documents, there is provided an escrow unit only for escrowing the deposited banknotes until the banknotes are stored in the storing unit.

However, in each of the banknote handling systems that have been disclosed in these documents, the provision of the escrow unit having a structure other than that of the storing unit causes the size of the system to become larger as well as the control of the system to become complicated.

In addition, the capacity of the escrow unit of each of the banknote handling systems disclosed in the above documents is smaller than those of the storing unit and the inlet. Thus, in each of the banknote handling systems disclosed in the above documents, the deposit-process operation has to be divided into a plurality of deposit processes when the number of banknotes to be deposited is larger than the capacity of the escrow unit. In this case, after the banknotes deposited by the first deposit process are stored from the escrow unit into the storing unit, the banknotes deposited by the second deposit process are taken into the escrow unit. At this stage, when there are inputted a certain instruction requesting that the banknotes should be returned, the banknotes deposited by the second deposit process can be mechanically returned from the escrow unit, but the banknotes deposited by the first deposit process cannot be mechanically returned because the banknotes deposited by the first deposit process have been already stored in the storing unit. Thus, in order for the banknotes deposited by the first deposit process to be returned, the operator has to perform some manual operations for taking the banknotes from the storing unit, for example. As a result, the operator has to perform the manual operations in order to cope with the instruction requesting that the banknotes should be returned. This increases the operator's burden, which is a problem.

In addition, in each of the banknote handling systems disclosed in the above documents, a storing unit for reconciliation, which is used in a reconciliation process for the deposited banknotes, is provided besides the storing unit. This causes the size of the system to be larger as well as the control of the system to be complicated, which is a problem.

In addition, in a conventional banknote handling system used for a deposit process, when banknotes stored in a storing unit are subject to a reconciliation process, the banknotes are moved into another vacant storing unit, and the banknotes are returned to the original storing unit after the reconciliation process for all the banknotes is finished. As one example of this type of banknote handling system, there is known a banknote handling system disclosed in JP 2003-141599.

In this banknote handling system, two recognition processes are performed for a reconciliation of banknotes stored in a banknote storing unit. The first recognition process is performed for all the banknotes stored in the banknote storing unit. The second recognition process is performed only for banknotes that could not be recognized during the first recognition process because of a certain transport error or the like. Thus, a transport path for the reconciliation process in this banknote handling system is formed in such a manner that all the banknotes stored in the banknote storing unit can go through a recognition unit and banknotes that could not be recognized during the first recognition process can go through the recognition unit again.

However, in this banknote handling system, the recognition unit is provided away from the banknote storing unit. Thus, the transport path for the reconciliation process is very long. As a result, in proportion to the length of the transport path, a time required for the reconciliation process is unavoidably made longer, which is a problem.

In addition, in this banknote handling system, when a certain transport error is recognized by the first recognition process, the banknote handling operation is stopped. Herein, the transport error is caused more often when the transport path is longer. Thus, the banknote handling operation is stopped more often when the transport path is longer. As a result, in proportion to the number of times the banknote handling operation is stopped, a time required for the reconciliation process is unavoidably made longer, which is a problem.

In addition, in a conventional banknote handling system used for a deposit process, a first recognition process is performed for put-in banknotes by means of a recognition unit, and only banknotes for which the first recognition process has been successfully performed are escrowed in an escrow unit. Then, when there are received a certain instruction for deposit confirmation, the banknotes escrowed in the escrow unit are fed out and stored in a storing unit via the recognition unit. At this stage, a second recognition process is performed for the banknotes fed out from the escrow unit by means of the recognition unit, and only banknotes for which the second recognition process has been successfully performed are stored in the storing unit. Banknotes for which the first or second recognition process has been unsuccessfully performed are treated as reject banknotes, and are stacked in a reject unit. As one example of this type of banknote handling system, there is known a banknote handling system disclosed in JP 7-282316.

However, in this banknote handling system, banknotes for which the second recognition process has been unsuccessfully performed are treated as reject banknotes, even if the first recognition process has been successfully performed for the banknotes. In addition, in this banknote handling system, a third recognition process is performed for the banknotes for which the second recognition process has been unsuccessfully performed. The third recognition process is repeated until all the banknotes for which the second recognition process has been unsuccessfully performed are successfully recognized. Therefore, the number of banknotes treated as reject banknotes is increased, and processes for the reject banknotes are performed more often. As a result, a time required for all the banknotes escrowed in the escrow unit to be stored in the storing unit is unavoidably made longer, which is a problem.

DISCLOSURE OF THE INVENTION

The present invention has been made in view of the above circumstances. The object of the present invention is to provide a banknote handling system whose control is simplified and which is compact. In addition, the object of the present invention is to provide a banknote handling system in which a time required for a reconciliation process can be reduced. Furthermore, the object of the present invention is to provide a banknote handling system in which a time required for all banknotes escrowed in an escrow unit to be stored in a storing unit can be reduced.

The present invention is a banknote handling system including: a reception unit configured to receive a banknote that has been put therein; a recognition unit configured to recognize the banknote that has been received by the reception unit; a storing unit having at least one first cassette configured to store or escrow the banknote that has been recognized by the recognition unit, and at least one second cassette configured to store the banknote that has been recognized by the recognition unit; an operation unit configured to receive a deposit-confirmation instruction for the banknote that has been escrowed in the first cassette; and a control unit configured to cause the banknote that has been recognized by the recognition unit to be escrowed in the first cassette and to cause, when the deposit-confirmation instruction is received by the operation unit, the banknote that has been escrowed in the first cassette to be stored in the second cassette.

According to the present invention, the banknote handling system can be made compact, and control thereof can be simplified.

Preferably, the banknote handling system further includes a storing detection unit configured to detect the number of banknotes in the second cassette, and the control unit is configured to cause the banknote that has been escrowed in the first cassette to be stored in the same first cassette, when the number of banknotes in the second cassette detected by the storing detection unit is more than a predetermined number.

In this case, more preferably, the storing detection unit is configured to detect the number of banknotes stored in the first cassette, and the control unit is configured to calculate an amount of free space of the second cassette based on the number of banknotes in the second cassette detected by the storing detection unit, and to cause the banknote that has been escrowed in the first cassette to be stored in the second cassette when the number of banknotes in the first cassette detected by the storing detection unit is not more than the amount of free space of the second cassette.

In addition, preferably, the banknote handling system further includes a storing detection unit configured to detect the number of banknotes in the first cassette and a reception detection unit configured to detect the number of banknotes that has been put in the reception unit, and the control unit is configured to calculate an amount of free space of the first cassette based on the number of banknotes in the first cassette detected by the storing detection unit, and to cause the banknotes that has been put in the reception unit to be received in the reception unit when the number of banknotes in the reception unit detected by the reception detection unit is not more than the amount of free space of the first cassette.

In addition, preferably, the control unit is configured to cause the banknote that has been stored in the second cassette to be escrowed in the first cassette, to cause the banknote that has been escrowed in the first cassette to be recognized by the recognition unit, thereby carrying out a reconciliation process for the banknote, and to cause the banknote for which the reconciliation process has been finished to be stored again in the second cassette.

In addition, preferably, the maximum capacity of the first cassette is larger than the number of banknotes capable of being put in the reception unit.

In addition, preferably, the storing unit includes a plurality of second cassettes, and the control unit is configured to cause the banknote that has been recognized by the recognition unit to be escrowed in the first cassette and to cause, when the deposit confirmation instruction is received by the operation unit, the banknote that has been escrowed in the first cassette to be stored in any of the plurality of second cassettes.

In addition, the present invention is a banknote handling system including: a reception unit configured to receive a banknote that has been put therein; a recognition unit configured to recognize the banknote that has been received by the reception unit; a storing unit having at least one first cassette configured to escrow the banknote that has been recognized by the recognition unit and to feed out therefrom the banknote that has been escrowed therein, and at least one second cassette configured to store the banknote that has been recognized by the recognition unit and to feed out therefrom the banknote that has been stored therein; a transport path provided between the first cassette and the second cassette; a transport-error detection unit configured to detect a transport error of a banknote on the transport path; and a control unit configured to control the second cassette so as to feed out the banknote stored therein to the transport path, to cause the banknote fed out from the second cassette without a transport error to be escrowed in the first cassette if the transport-error detection unit of the transport path does not detect a transport error, to control the first cassette so as to feed out the banknote escrowed therein, to cause the banknote to be recognized by the recognition unit, thereby carrying out a reconciliation process for the banknote, and to cause the banknote for which the reconciliation process has been finished to be stored again in the second cassette.

According to the present invention, a time required for the reconciliation process can be reduced.

Preferably, a reject unit is provided for stacking banknotes of which a transport error has been detected by the transport-error detection unit; and the control unit is configured to control the second cassette so as to feed out the banknote stored therein to the transport path, and to cause the banknote fed out from the second cassette with a transport error being detected by the transport-error detection unit to be stacked in the reject unit if the transport-error detection unit of the transport path detects a transport error.

In this case, preferably, the reject unit further includes a feeding mechanism configured to feed out the banknotes stacked therein; and the control unit is configured to control the reject unit so as to feed out the banknotes stacked therein, to perform a reconciliation process for the banknotes by causing the recognition unit to recognize the banknotes, and to cause the banknotes whose reconciliation process has been finished to be stored again in the second cassette.

In addition, preferably, the transport-error detection unit is configured to detect at least one of a skewed state, a chained state, an overlapped state and a banknote-interval of the banknotes while the banknotes are transported.

In this case, more preferably, the transport-error detection unit is configured to detect a banknote-interval of the banknotes while the banknotes are transported, and the control unit is configured to control the second cassette so as to adjust the banknote-interval of the banknotes fed out from the second cassette when a transport error regarding the banknote-interval is detected by the transport-error detection unit.

In addition, preferably, an operation unit configured to receive a reconciliation instruction for the banknotes that have been stored in the second cassette is provided, and the control unit is configured to start the reconciliation process based on the reconciliation instruction received by the operation unit.

In addition, preferably, the operation unit is configured to receive a deposit instruction for banknotes, and the control unit is configured to cause the reception unit to receive banknotes that have been put in the reception unit when a deposit instruction is received by the operation unit.

In addition, the present invention is a banknote handling system including: a reception unit configured to receive a banknote that has been put therein; a recognition unit configured to recognize the banknote that has been received by the reception unit; an escrow unit having an escrow mechanism configured to escrow the banknote that has been recognized by the recognition unit and a feeding mechanism configured to feed out the escrowed banknote; an operation unit configured to receive a deposit-confirmation instruction for the banknote that has been escrowed in the escrow unit; a storing unit having a plurality of cassettes configured to store the banknote fed out from the escrow unit; a storage unit configured to store escrow data including amount-of-money data of the escrow unit and storing data including amount-of-money data of the storing unit; and a control unit configured to cause the banknote that has been recognized by the recognition unit to be escrowed in the escrow unit and to control the escrow unit so as to cause, when the deposit-confirmation instruction is received by the operation unit, the banknote that has been escrowed in the escrow unit to be fed out and to be stored in the plurality of second cassettes; wherein the control unit is configured to update the storing data based on recognition result by the recognition unit for the banknote stored in the plurality of second cassettes.

According to the present invention, a process time required for all the banknotes escrowed in the escrow unit to be stored in the storing unit can be reduced remarkably effectively.

Preferably, the control unit is configured to cause banknotes fed out from the escrow unit to be recognized by the recognition unit and to be divided and stored in the plurality of cassettes respectively, when the deposit-confirmation instruction is received by the operation unit and the banknotes that have been escrowed in the escrow unit cannot be stored in any of the plurality of cassettes collectively.

Alternatively, preferably, the control unit is configured to cause banknotes fed out from the escrow unit to be stored in any of the plurality of cassettes collectively, when the deposit-confirmation instruction is received by the operation unit and any of the plurality of cassettes is capable of collectively storing the banknotes that have been escrowed in the escrow unit.

In addition, preferably, the storing data includes amount-of-money data of each of the plurality of cassettes of the storing unit. In this case, preferably, the control unit is configured to calculate an amount of free space of each of the plurality of cassettes based on the storing data. More preferably, the control unit is configured to cause the banknotes fed out from the escrow unit to be divided and stored in the plurality of cassettes respectively based on the amount of free space.

In addition, preferably, the banknote handling system further includes a system-inside reject unit having an escrow mechanism configured to escrow, as a reject banknote, a banknote that has been fed out from the escrow unit and whose reject factor has been recognized by the recognition unit; and the control unit is configured to cause the banknote whose reject factor has been recognized by the recognition unit to be escrowed in the system-inside reject unit as a reject banknote.

For example, the system-inside reject unit is provided integrally with the reception unit.

In addition, preferably, the control unit is configured to calculate amount-of-money data of the system-inside reject unit based on the escrow data and recognition result by the recognition unit.

In addition, preferably, the system-inside reject unit further includes a feeding mechanism configured to feed out the reject banknote, the storing unit further includes a removable cassette configured to store a predetermined reject banknote, and the control unit is configured to control the system-inside reject unit so as to cause the reject banknote escrowed in the system-inside reject unit to be fed out, to cause the banknote to be recognized again by the recognition unit, and to cause the banknote to be stored in the removable cassette as a reject banknote when the reject factor is recognized again. In this case, more preferably, the control unit is configured to control the system-inside reject unit so as to cause the reject banknote escrowed in the system-inside reject unit to be fed out, to cause the banknote to be recognized again by the recognition unit, and to cause the banknote to be stored in the plurality of cassettes as a normal banknote when denomination is normally recognized.

Alternatively, preferably, the system-inside reject unit further includes a feeding mechanism configured to feed out the reject banknote, the control unit is configured to control the system-inside reject unit so as to cause the reject banknote escrowed in the system-inside reject unit to be fed out, to cause the banknote to be recognized again by the recognition unit, and to cause the banknote to be stored in any of the plurality of cassettes as a normal banknote when denomination is normally recognized.

BRIEF DESCRIPTION OF THE DRAWINGS

FIG. 23 is a schematic view showing data structure of recognition data 2101B;

FIG. 24 is a schematic view showing data structure of escrow data 2101C;

FIG. 25 is a schematic view showing data structure of storing data 2101D;

FIG. 29 is a flowchart showing a process procedure of a destination determination process (S2803 of FIG. 28) in the embodiment 6 according to the present invention;

FIG. 30 is a schematic view showing data structure of destination data 2101E;

FIG. 31 is a schematic view showing data structure of system-inside reject data 2101F.

BEST MODE FOR CARRYING OUT THE INVENTION

Embodiments according to the present invention will be described herebelow with reference to the drawings. The following embodiments are mere examples of the present invention, and thus do not limit the scope of the present invention.

Embodiment 1

First, the embodiment 1 of the present invention is explained. The embodiment 1 relates to an example of deposit process in which banknotes are escrowed in one cassette among a plurality of cassettes which are provided for storing the banknotes.

At first, the structure of a banknote handling system 10 according to the embodiment 1 is described with reference to FIGS. 1 and 2.

Figure 1:
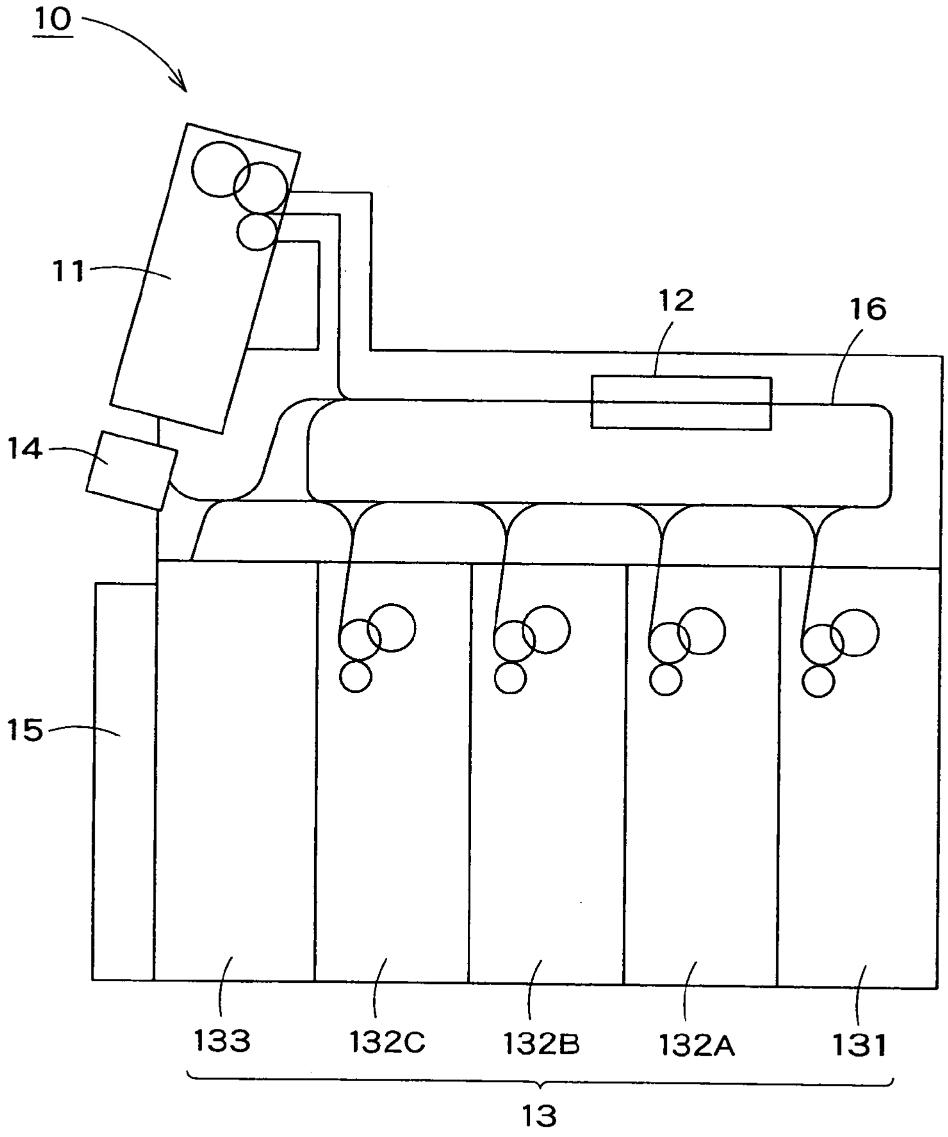
FIG. 1 is a schematic view showing an inside structure of a banknote handling system 10 in an embodiment 1 according to the present invention.
Figure 2:
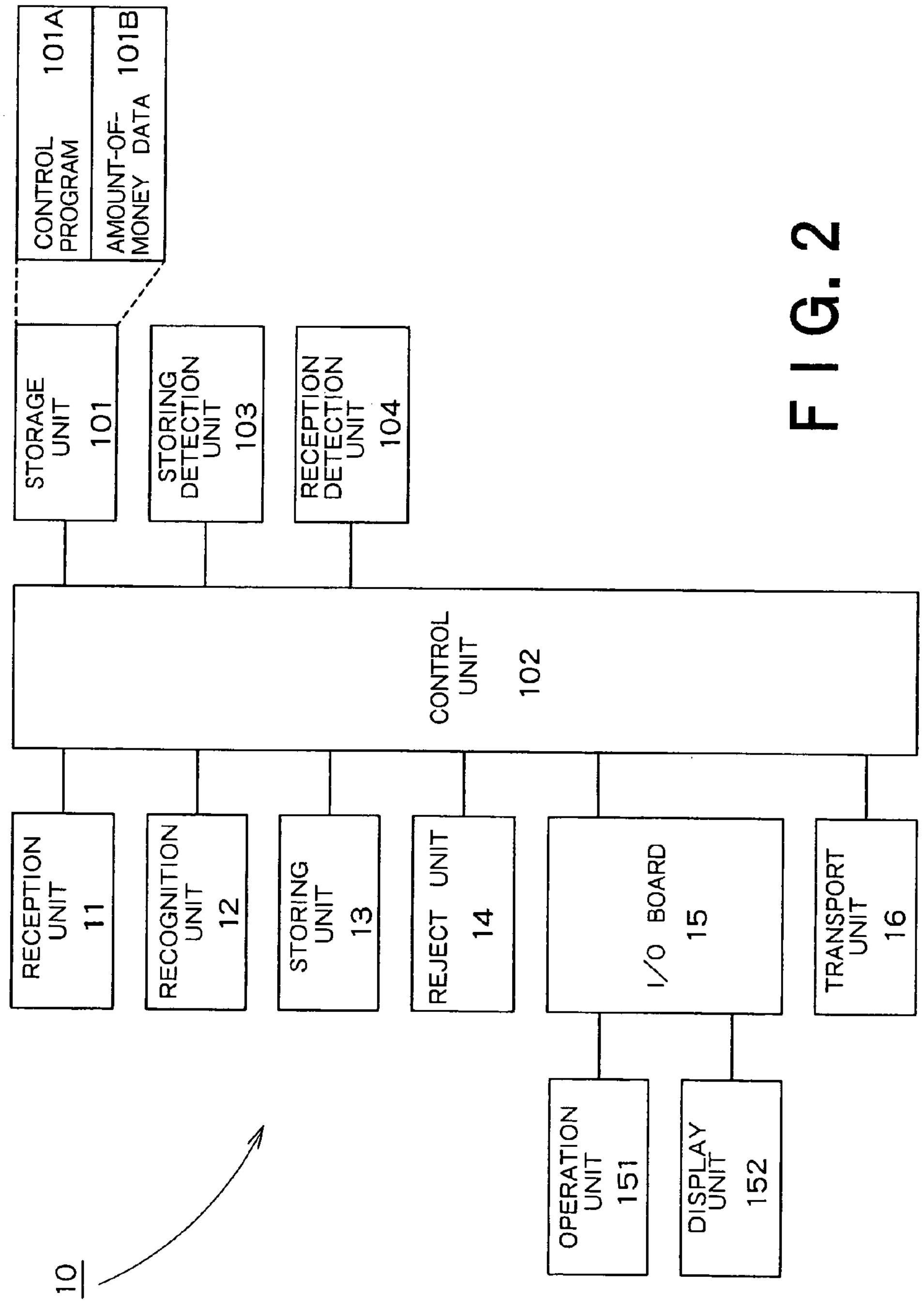
FIG. 2 is a block view showing a control block of the banknote handling system 10 in the embodiment 1 according to the present invention.

FIG. 1 is a schematic view showing an inside structure of a banknote handling system 10 in the embodiment 1 according to the present invention. FIG. 2 is a block view showing a control block of the banknote handling system 10 in the embodiment 1 according to the present invention.

As shown in FIG. 1, the banknote handling system 10 includes a reception unit 11, a recognition unit 12, a storing unit 13, a reject unit 14, an I/O board 15 and a transport unit 16. As shown in FIG. 2, the banknote handling system 10 further includes a storage unit 101, a control unit 102, a storing detection unit 103, and a reception detection unit 104.

The storage unit 101 is configured to store a control program 101A for the control unit 102 and amount-of-money data 1016 of the banknotes stored in the storing unit 13. In addition, the storage unit 101 serves as a working memory of the control unit 102.

The control unit 102 is connected to the reception unit 11, the recognition unit 12, the storing unit 13, the reject unit 14, the I/O board 15, the transport unit 16, the storage unit 101, the storing detection unit 103 and the reception detection unit 104. Upon actuation of the control program 101A stored in the storage unit 101, the control unit 102 is configured to control the reception unit 11, the recognition unit 12, the storing unit 13, the reject unit 14, the I/O board 15, the transport unit 16, the storing detection unit 103 and the reception detection unit 104.

The reception unit 11 includes a feeding roller for feeding out one by one the banknotes that the operator has put in the reception unit 11. The feeding roller feeds out the put-in banknotes, so that the banknotes are received inside the banknote handling system 10. For example, the number of banknotes that the operator can put in the reception unit 11 at one time (the number of banknotes that can be put in) is five hundreds.

The recognition unit 12 includes various sensors (for example, a line sensor) for recognizing denomination of each of the banknotes received by the reception unit 11. In addition, when the recognition unit 12 recognizes the denomination, the recognition unit 12 sends the denomination as a recognition result to the control unit 102. When a reject factor such as a transport error (a skewed state, a chained state or an overlapped state), a banknote error (a counterfeit note or a unfit note) or another recognition error is recognized, the recognition unit 12 sends the reject factor as a recognition result to the control unit 102. Then, the control unit 102 judges the banknote whose denomination has been recognized as a “normal banknote”, and the banknote whose reject factor has been recognized as a “reject banknote”.

The storing unit 13 is formed of a first cassette 131, a plurality of second cassettes 132A to 132C, and an additional cassette space 133. The first cassette 131 includes: a storing mechanism for escrowing or storing the banknote that has been recognized as a "normal banknote" by the control unit 102; and a feeding roller for feeding out the escrowed banknote(s) one by one. Each of the second cassettes 132A to 132C includes: a storing mechanism for storing the banknote that has been recognized as a "normal banknote" by the control unit 102; and a feeding roller for feeding out the stored banknote(s) one by one. The first cassette 131 and the second cassettes 132A to 132C are drawable from the outside. An additional-cassette space 133 is provided in such a manner that an additional cassette including a storing mechanism for storing banknotes can be added in the additional-cassette space 133 from the outside in addition to the second cassettes 132A to 132C. The maximum capacity of each of the first cassette 131 and the second cassettes 132A to 132C is common (the same), for example 3000 as the number of banknotes. The respective maximum capacities of the first cassette 131 and the second cassettes 132A to 132C can be freely changed as long as they are larger than the number of banknotes that can be put in the reception unit 11.

The reject unit 14 is configured to stack (collect) banknotes that have been judged as the "reject banknotes" by the control 102. The reject unit 14 is structured in such a manner that the stacked banknotes are removable from the outside.

The I/O board 15 is connected to an operation unit 151 and a display unit 152. The operation unit 151 has various keys for receiving an instruction from the operator. The display unit 152 has a liquid crystal display for displaying various information to the operator.

The transport unit 16 is formed of transport belts, transport-path rollers, diverters and motors for driving these elements, which are arranged for transporting the banknotes between the reception unit 11, the recognition unit 12, the first cassette 131, the second cassettes 132A to 132C, and the reject unit 14.

The storing detection unit 103 includes sensors and counters, for detecting the number of banknotes in the storing unit 13 (the first cassette 131 and the second cassettes 132A to 132C). The storing detection unit 103 is configured to send the detection result to the control unit 102.

The reception detection unit 104 includes a sensor and a counter, for detecting the number of banknotes put in the reception unit 11. The reception detection unit 104 is configured to send the detection result to the control unit 102.

Next, an operation of the banknote handling system 10 in the embodiment 1 according to the present invention will be described with reference to FIG. 1.

As shown in FIG. 1, in the banknote handling system 10, the banknotes that have been put in the reception unit 11 are fed out to the transport unit 16 by means of the feeding roller of the reception unit 11. The banknotes fed out by this feeding roller are recognized by the recognition unit 12. The banknotes whose denomination has been recognized by the recognition unit 12 are escrowed in the first cassette 131. The banknotes whose reject factor has been recognized by the recognition unit 12 are stacked in the reject unit 14. The banknotes that have been escrowed in the first cassette 131 are fed out to the transport unit 16 by means of the feeding roller of the first cassette 131, after a deposit confirmation instruction is received by the operation unit 151. The banknotes fed out by this feeding roller are transported to any of the second cassettes 132A to 132C by means of the transport unit 16. The banknotes are stored in the second cassettes 132A to 132C depending on their denomination.

Next, process contents of the banknote handling system 10 in the embodiment 1 according to the present invention will be described with reference to FIGS. 3 to 5.

Figure 3:
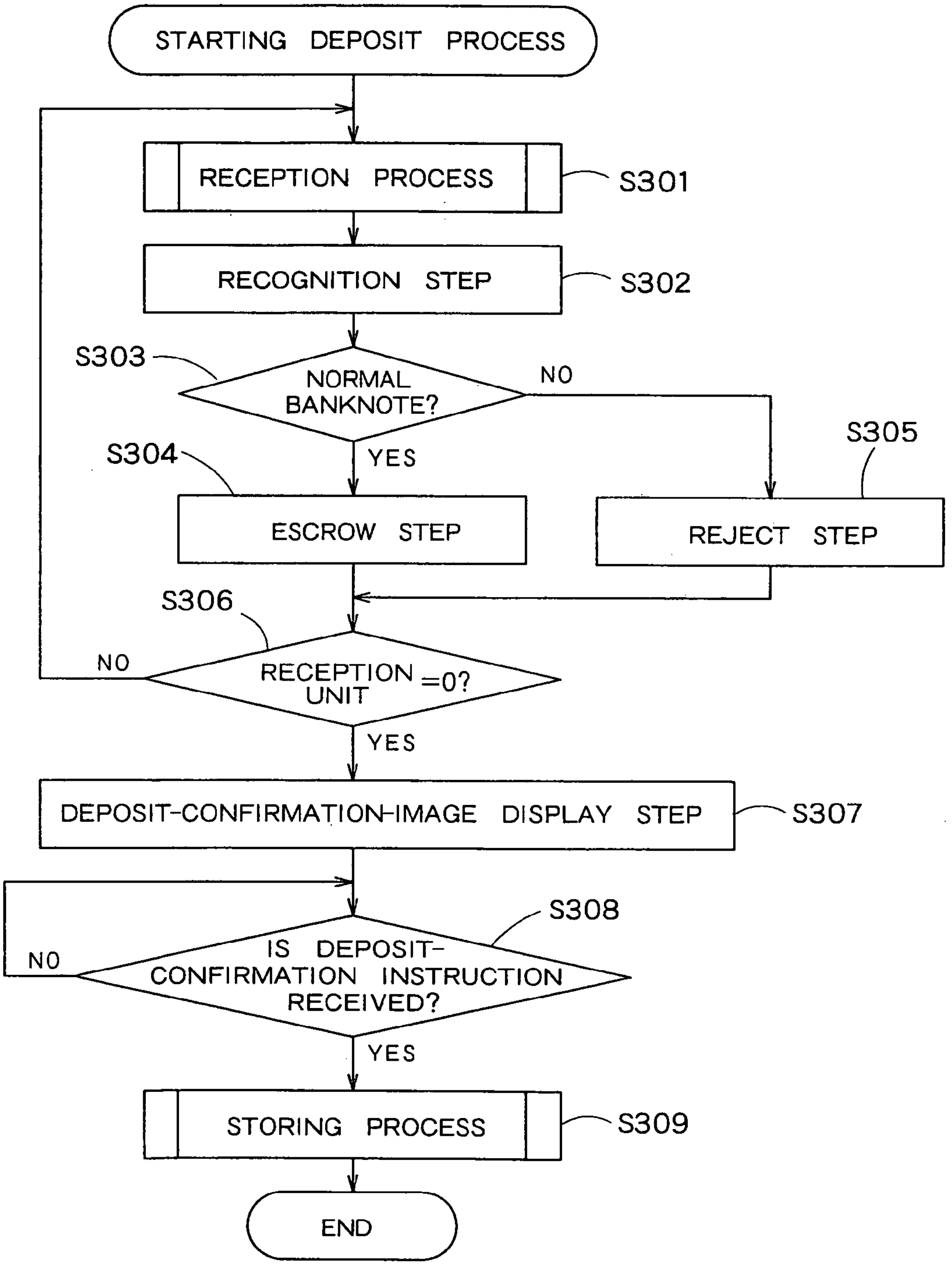
FIG. 3 is a flowchart showing a process procedure of a deposit process in the embodiment 1 according to the present invention.

FIG. 3 is a flowchart showing a process procedure of a deposit process in the embodiment 1 according to the present invention.

At first, as shown in FIG. 3, a reception process (S301) is performed.

Figure 4:
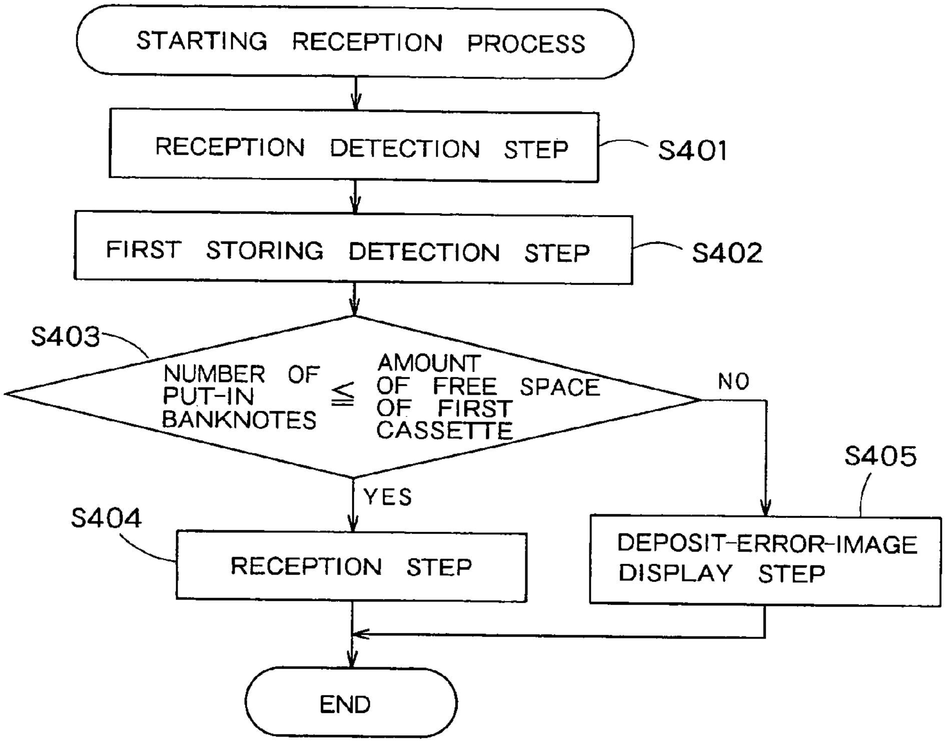
FIG. 4 is a flowchart showing a process procedure of a reception process (S301 in FIG. 3) in the embodiment 1 according to the present invention.

FIG. 4 is a flowchart showing a process procedure of the reception process (S301 of FIG. 3) in the embodiment 1 according to the present invention.

At first, as shown in FIG. 4, a reception detection step (S401) is performed. In the reception detection step (S401), the reception detection unit 104 detects the number of banknotes that have been put in the reception unit 11, and sends the detection result to the control unit 102.

Subsequently, a first storing detection step (S402) is performed. In the first storing detection step (S402), the storing detection unit 103 detects the number of banknotes that have been escrowed in the first cassette 131, and sends the detection result to the control unit 102. At this time, the control unit 102 calculates the amount of free space in the first cassette 131 based on the detection result sent from the storing detection unit 103.

When the number of banknotes that have been put in is not more than the amount of free space of the first cassette 131 (S403-YES), a reception step (S404) is performed. In the reception step (S404), the reception unit 11 receives the put-in banknotes inside the banknote handling system 10.

On the other hand, when the number of banknotes that have been put in is larger than the amount of free space of the first cassette 131 (S403-NO), a deposit-error-image display step (S405) is performed. In the deposit-error-image display step (S405), the control unit 102 causes the display unit 152 to display a deposit-error image including a message representing a deposit-error situation.

The reception process (S301 of FIG. 3) is finished after the reception step (S404) or the deposit-error-image display step (S405).

As shown in FIG. 3, a recognition step (S302) is performed after the reception process (S301). In the recognition step (S302), the recognition unit 12 recognizes each of the banknotes that have been received by the reception unit 11 at the reception step (S404 of FIG. 4), and sends the recognition result to the control unit 102. At this time, the control unit 102 judges each of the banknotes as a "normal banknote" or a "reject banknote" based on the recognition result. In addition, the control unit 102 writes in the storage unit 101 the number of "normal banknotes" for each denomination or the reject factor of the "reject banknote".

When a "normal banknote" is judged by the control unit 102 (S303-YES), an escrow step (S304) is performed. In the escrow step (S304), the control unit 102 causes the banknote judged as the "normal banknote" to be escrowed in the first cassette 131.

On the other hand, when a "reject banknote" is judged by the control unit 102 (S303-NO), a reject step (S305) is performed. In the reject step (S305), the control unit 102 causes the banknote judged as the "reject banknote" to be stacked in the reject unit 14.

The steps S303 to S305 are repeatedly performed until the banknotes that have been put in the reception unit 11 finish going away therefrom (S306-NO).

When the banknotes that have been put in the reception unit 11 finish going away therefrom (S306-YES), a deposit-confirmation-image display step (S307) is performed. In the deposit-confirmation-image display step (S307), the control unit 102 causes the display unit 152 to display a deposit-confirmation image including a message representing the number of banknotes that have been escrowed in the first cassette 131 and a message promoting a deposit confirmation instruction for fixing the process contents of the deposit process.

When a deposit confirmation instruction is received by the operation unit 151 (S308-YES), a storing process (S309) is performed.

Figure 5:
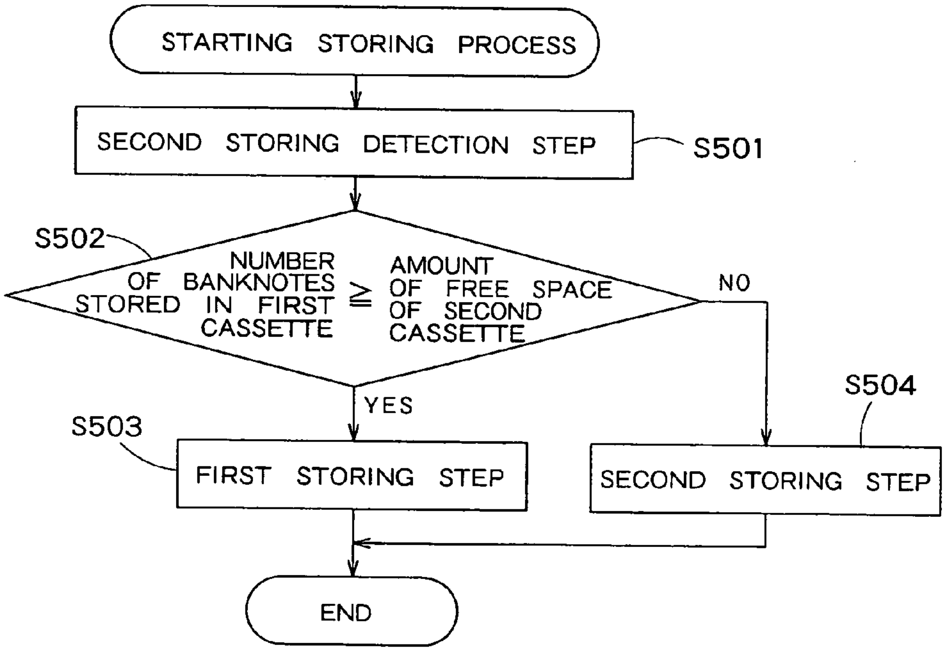
FIG. 5 is a flowchart showing a process procedure of a storing process (S309 in FIG. 3) in the embodiment 1 according to the present invention.

FIG. 5 is a flowchart showing a process procedure of the storing process (S309 of FIG. 3) in the embodiment 1 according to the present invention.

As shown in FIG. 5, at first, a second storing detection step (S501) is performed. In the second storing detection step (S501), the storing detection unit 103 detects the number of banknotes that have been escrowed in the first cassette 131 and the respective numbers of the respective banknotes that have been stored in the respective second cassettes 132A to 132C, and sends the detection results to the control unit 102. At this time, the control unit 102 calculates the respective amounts of free space in the respective second cassettes 132A to 132C based on the detection results sent from the storing detection unit 103.

In general banknote handling systems, banknotes that have been escrowed in an escrow unit are stored in another storing unit. However, in the embodiment 1 of the present invention, when the number of banknotes escrowed in the first cassette 131 is larger than the sum of the amounts of free space in the second cassettes 132A to 132C (S502-YES), the banknotes escrowed in the first cassette 131 are directly stored in the same first cassette 131, i.e., a first storing step (S503) is performed, because the banknotes in the first cassette 131 cannot be stored in the second cassettes 132A to 132C. In the first storing step (S503), the banknotes in the first cassettes 131 are switched from their escrowed state to their stored state (deposit confirmed state), while the banknotes are maintained therein. At this time, the control unit 102 updates the amount-of-money data 1018 of the first cassette 131, based on the detection results sent from the storing detection unit 103.

When the number of banknotes escrowed in the first cassette 131 is not larger than the sum of the amounts of free space in the second cassettes 132A to 132C (S502-NO), a second storing step (S504) is performed. In the second storing step (S504), the control unit 102 causes the banknotes that have been escrowed in the first cassette 131 to be stored in any of the second cassettes 132A to 132C. At this time, the control unit 102 updates the amount-of-money data 1016 of the respective second cassettes 132A to 132C, based on the detection results sent from the storing detection unit 103.

The storing process (S309 of FIG. 3) is finished after the first storing step (S503) or the second storing step (S504).

As shown in FIG. 3, the deposit process of the embodiment 1 of the present invention is finished after the storing process (S309).

In the embodiment 1 of the present invention, the number of the second cassettes 132A to 132C is three. However, the present invention is not limited thereto.

In addition, in the embodiment 1 of the present invention, regarding the storing manner for storing the banknotes in the respective second cassettes 132A to 132C, the banknotes may be stored in the second cassettes 132A to 132C for each denomination or may be stored in the second cassettes 132A to 132C depending on their layout regardless of denomination. If the banknotes are stored for each denomination, an operation after the banknote collection is made easier. If the banknotes are stored according to the layout of the second cassettes, the time required for the banknote collection can be reduced.

In addition, in a modified example of the embodiment 1 of the present invention, the reception step (S404 of FIG. 4) is performed when no banknote is escrowed in the first cassette 131, and the deposit-error-image display step (S405 of FIG. 4) is performed when at least one banknote is escrowed in the first cassette 131.

In addition, in another modified example of the embodiment 1 of the present invention, the reception step (S404 of FIG. 4) is performed when the amount of free space of the first cassette 131 is not smaller than the number of banknotes that can be put in the reception unit 11, and the deposit-error-image display step (S405 of FIG. 4) is performed when the amount of free space of the first cassette 131 is smaller than the number of banknotes that can be put in the reception unit 11.

In addition, in another modified example of the embodiment 1 of the present invention, the first storing step (S503 of FIG. 5) and the second storing step (S504 of FIG. 5) can be switched based on the sum of the numbers of the banknotes stored in the second cassettes 132A to 132C.

According to the embodiment 1, the banknotes are escrowed in one cassette (first cassette 131) among the plurality of cassettes for storing the banknotes. Thus, the size of the system is prevented from becoming larger and the control of the system is prevented from becoming complicated, which might be caused by separately providing a cassette and an escrow unit.

Embodiment 2

Next, another embodiment 2 of the present invention is explained. The embodiment 2 relates to an example of reconciliation process in which banknotes that have been stored in the second cassette are escrowed in the first cassette and then are subject to a reconciliation process. Description of the same process contents as those of the embodiment 1 according to the present invention is omitted.

At first, the reconciliation process of in the embodiment 2 is explained with reference to FIG. 6. The reconciliation process is performed on a date and a time that have been determined in advance, under the condition that banknotes are stored in the second cassettes 132A to 132C after a deposit process of the embodiment 1 (FIG. 3) has been finished. In the embodiment 2, an example of reconciliation process for the banknotes stored in the second cassette 132A is explained.

Figure 6:
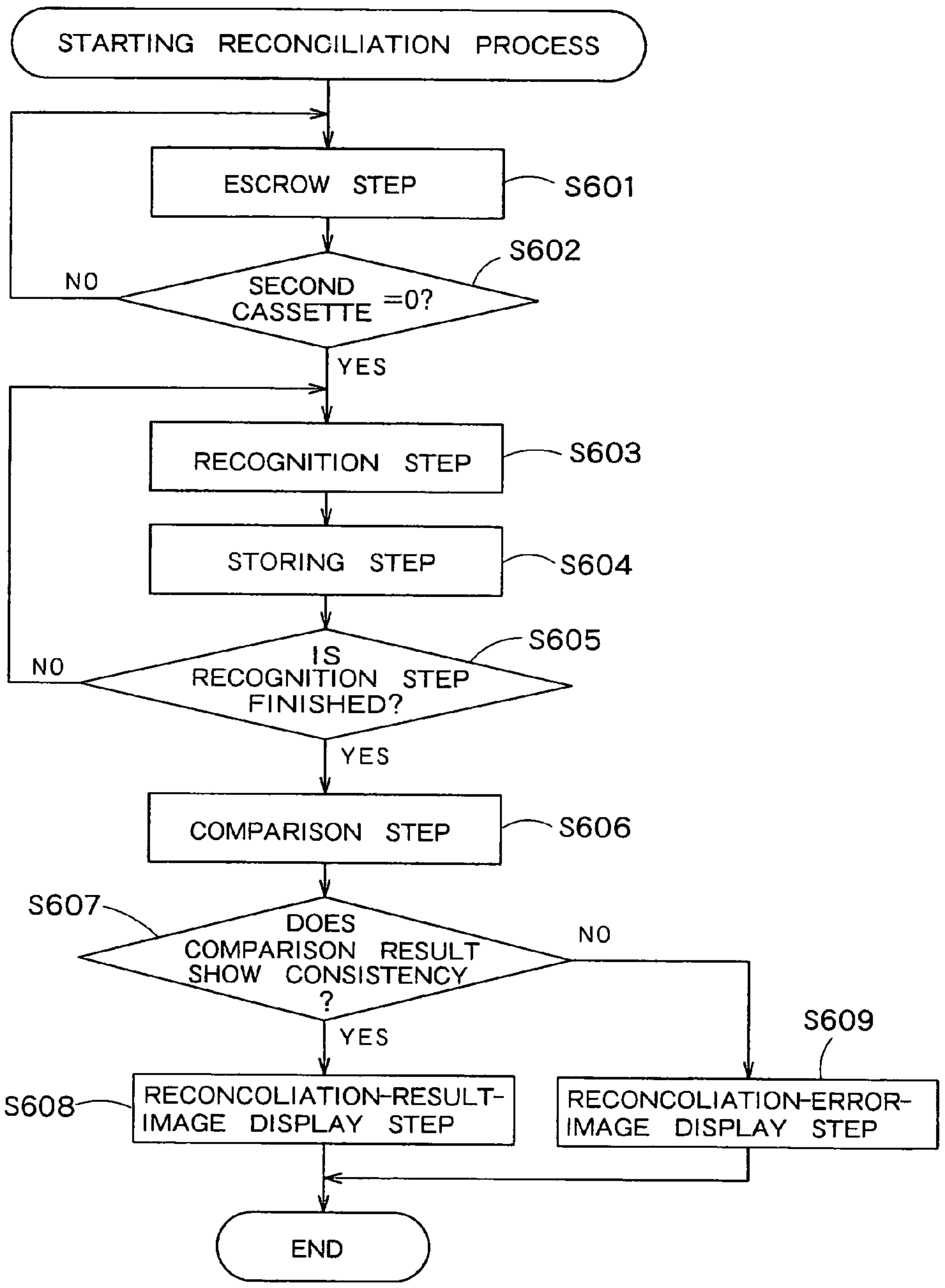
FIG. 6 is a flowchart showing a process procedure of a reconciliation process in an embodiment 2 according to the present invention.

FIG. 6 is a flowchart showing a process procedure of the reconciliation process in the embodiment 2 according to the present invention.

As shown in FIG. 6, at first, an escrow step (S601) is performed. In the escrow step (S601), the control unit 102 causes the banknotes stored in the second cassette 132A to be escrowed in the first cassette 132A. The escrow step (S601) is repeatedly performed until all the banknotes that have been stored in the second cassette 132A are escrowed in the first cassette 131 (S602-NO).

After all the banknotes that have been stored in the second cassette 132A are escrowed in the first cassette 131 (S602-YES), a recognition step (S603) is performed. In the recognition step (S603), the control unit 102 causes the banknotes that have been escrowed in the first cassette 131 at the escrow step (S601) to be fed out to the transport unit 16. Then, the recognition unit 12 recognizes denomination of each of the banknotes. At this time, the recognition unit 12 sends to the control unit 102 the number of banknotes for each denomination as a recognition result.

Then, a storing step (S604) is performed. In the storing step (S604), the control unit 102 causes the banknotes that have been recognized by the recognition unit 12 at the recognition step (S603) to be stored in the second cassette 132A. The storing step (S604) is repeatedly performed until all the banknotes that have been escrowed in the first cassette 131 at the escrow step (S603) finish being recognized (S605-NO).

After all the banknotes that have been escrowed in the first cassette 131 at the escrow step (S603) finish being recognized (S605-YES), a comparison step (S606) is performed. In the comparison step (S606), the control unit 102 compares the amount-of-money data 1016 stored in the storage unit 101 at the storing process (FIG. 5) of the embodiment 1 and the recognition result (the number of banknotes for each denomination) sent from the recognition unit 12 at the recognition step (S603) of the reconciliation process of the embodiment 2.

When the comparison result of the comparison step (S606) shows consistency (S607-YES), a reconciliation-result-image display step (S608) is performed. In the reconciliation-result-image display step (S608), the control unit 102 causes the display unit 152 to display a reconciliation-result image including a message representing that there is no problem in the reconciliation result.

On the other hand, when the comparison result of the comparison step (S606) shows inconsistency (S607-NO), a reconciliation-error-image display step (S609) is performed. In the reconciliation-error-image display step (S609), the control unit 102 causes the display unit 152 to display a reconciliation-error image including a message representing that there is some problem in the reconciliation result.

The reconciliation process of the embodiment 2 is finished after the reconciliation-result-image display step (S608) or the reconciliation-error-image display step (S609).

In the embodiment 2, all the banknotes that have been stored in the plurality of second cassettes 132A to 132C can be subject to the reconciliation process (FIG. 6). In this case, the reconciliation process for the banknotes that have been stored in the second cassette 132A, the reconciliation process for the banknotes that have been stored in the second cassette 132B and the reconciliation process for the banknotes that have been stored in the second cassette 132C are performed in no particular order.

According to the embodiment 2, in the reconciliation process for the banknotes that have been stored in the second cassette 132A, the banknotes are escrowed in the first cassette 131 which has the same capacity as that of the second cassette 132A. Thus, all the banknotes that have been stored in the second cassette 132A can be escrowed in the first cassette 131 at one time. In particular, in a case wherein an automatic reconciliation process is set to be performed on a date and a time that have been determined, if the number of banknotes that have been stored in the second cassette 132A is larger than the number of banknotes that can be escrowed in an escrow unit, the automatic reconciliation process is not performed. However, according to the embodiment 2, regardless of the number of banknotes that have been stored in the second cassette 132A, the reconciliation process is always performed.

Embodiment 3

Next, another embodiment 3 of the present invention is explained. The embodiment 3 is configured to reverse face-up/face-back of each banknote in a recounting process for banknotes that have been escrowed in the first cassette. Description of the same process contents as those of the embodiments 1 and 2 is omitted.

At first, the structure of a banknote handling system 10 according to the embodiment 3 is described.

The banknote handling system 10 includes a reception unit 11 having a holding mechanism for temporally holding banknotes, in addition to the feeding roller for feeding out the banknotes that have been put therein. The other structure of the banknote handling system 10 according to the embodiment 3 is the same as the banknote handling system 10 according to the embodiment 1.

Next, a recounting process in the embodiment 3 will be described with reference to FIGS. 7 and 8. The recounting process is performed in the deposit-confirmation-image display step (S307 of FIG. 3) of the deposit process of the embodiment 1, when a deposit confirmation instruction is not received (for example, when a recounting instruction is received). In the embodiment 3, an example of recounting process is explained in which recounted banknotes are stored in the second cassette 132A.

Figure 7:
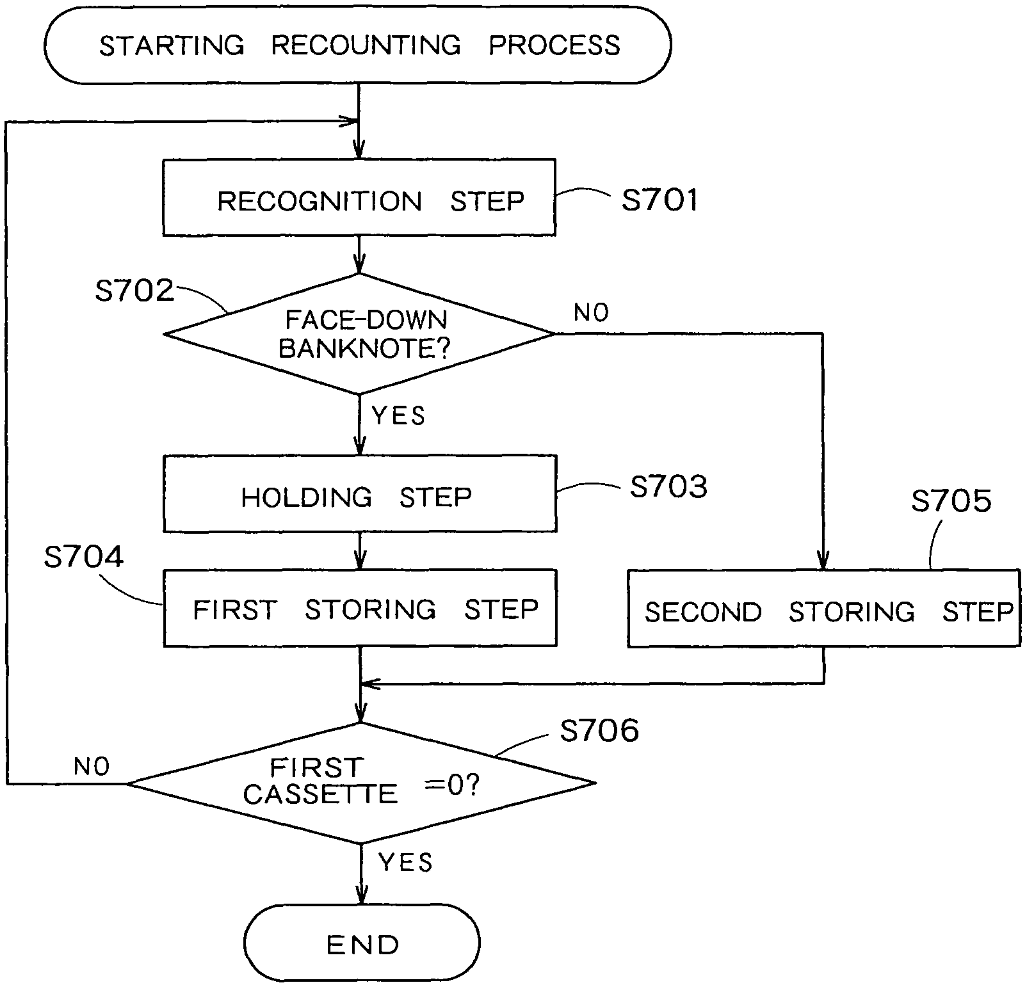
FIG. 7 is a flowchart showing a process procedure of a recounting process in the embodiment 2 according to the present invention.
Figure 8A:
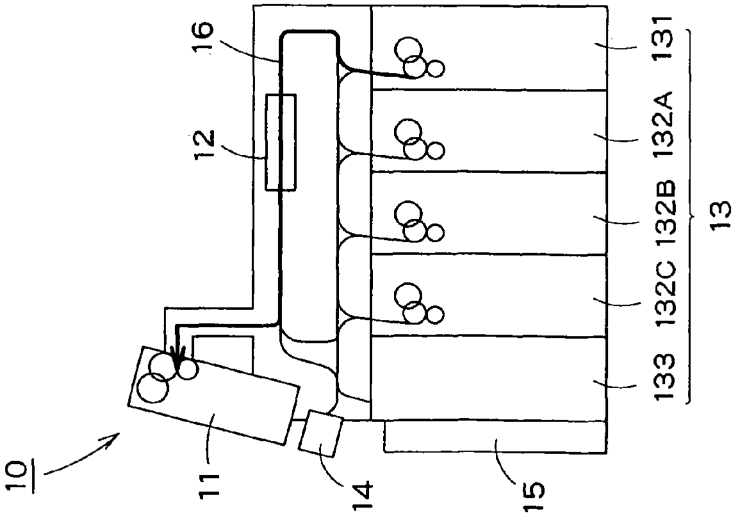
FIG. 8A is a schematic view showing a transport path of a recounting process in an embodiment 3 according to the present invention.
Figure 8B:
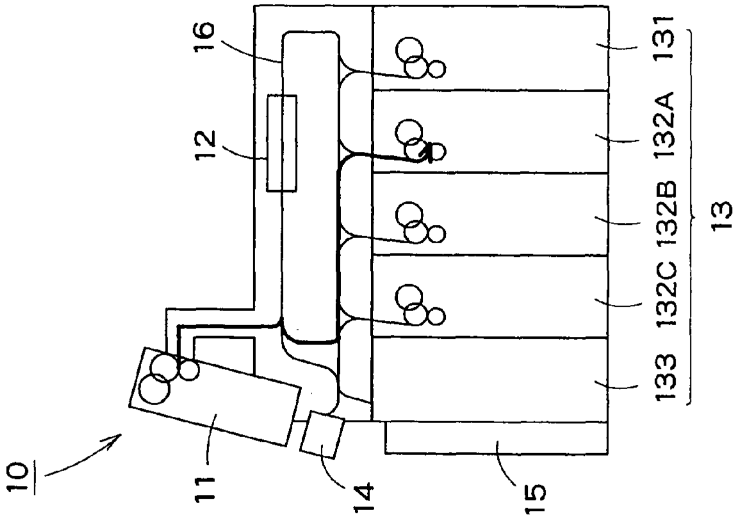
FIG. 8B is a schematic view showing another transport path of the recounting process in the embodiment 3 according to the present invention.
Figure 8C:
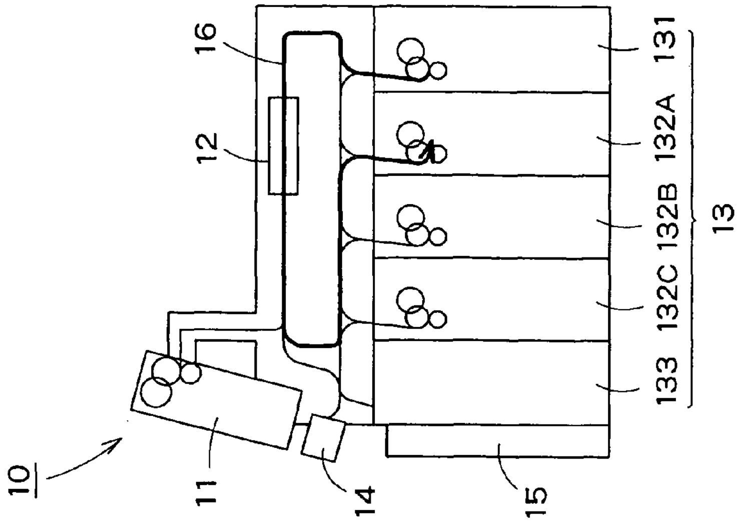
FIG. 8C is a schematic view showing another transport path of the recounting process in the embodiment 3 according to the present invention.

FIG. 7 is a flowchart showing a process procedure of the recounting process in the embodiment 3 according to the present invention.

At first, as shown in FIG. 7, a recognition process (S701) is performed. In the recognition process (S701), the control unit 102 causes banknotes that have been escrowed in the first cassette 131 to be fed out. Then, the recognition unit 12 recognizes denomination and face-up/face-down of each fed-out banknote. At this time, the recognition unit 12 sends to the control unit 102 the number of banknotes for each denomination and the face-up/face-down state of each banknote as a recognition result. The control unit 102 writes in the storage unit 101 the number of banknotes for each denomination.

When the recognition result (the face-up/face-down state of each banknote) sent from the recognition unit 12 at the recognition step (S701) shows a "face-down banknote" (S702-YES), a holding step (S703) is performed. In the holding step (S703), the control unit 102 causes the banknotes whose face-up/face-down has been recognized by the recognition unit 12 to be held in the reception unit 11. At this time, a transport path according to the recognition step (S701) and another transport path according to the holding step (S703) are formed as shown in FIG. 8 (A).

Then, a first storing step (S704) is performed. In the first storing step (S704), the control unit 102 causes the banknotes that have been held by the reception unit 11 at the holding step (S703) to be stored in the second cassette 132A. At this time, a transport path of the first storing step (S704) is formed as shown in FIG. 8 (B). At this time, the control unit 102 updates the amount-of-money data 101B of the second cassette 132A, based on the detection results sent from the storing detection unit 103.

On the other hand, when the recognition result (the face-up/face-down state of each banknote) sent from the recognition unit 12 at the recognition step (S701) shows a "face-up banknote" (S702-NO), a second storing step (S705) is performed.

In the second storing step (S705), the control unit 102 causes the banknotes whose face-up/face-down has been recognized by the recognition unit 12 to be stored in the second cassette 132A. At this time, a transport path according to the second storing step (S705) is formed as shown in FIG. 8 (C). At this time, the control unit 102 updates the amount-of-money data 1016 of the second cassette 132A, based on the detection results sent from the storing detection unit 103.

The steps S701 to S705 are repeatedly performed until all the banknotes that have been escrowed in the first cassette 131 finish being recognized (S706-NO).

The recounting process of the embodiment 3 is finished when all the banknotes that have been escrowed in the first cassette 131 finish being recognized (S706-YES).

According to the embodiment 3, in the recounting process for the banknotes that have been escrowed in the first cassette 131, the banknotes that have been recognized as the "face-up banknotes" and the banknotes that have been recognized as the "face-down banknotes" are stored in the second cassettes 132A to 132C via the transport paths different from each other. Accordingly, the face-up/face-down state of the banknotes stored in each of the second cassettes 132A to 132C can be made uniform. In particular, since the face-up/face-down state of the banknotes is made uniform without any face-up/face-down reversing mechanism, the cost for the banknote handling system 10 can be reduced.

Embodiment 4

Next, another embodiment 4 of the present invention is explained. The embodiment 4 relates to an example of deposit process in which banknotes, whose number is greater than the number of banknotes that can be put in the reception unit, are continuously handled. Description of the same process contents as those of the embodiments 1 to 3 is omitted.

At first, the deposit process of in the embodiment 4 is explained with reference to FIG. 9.

Figure 9:
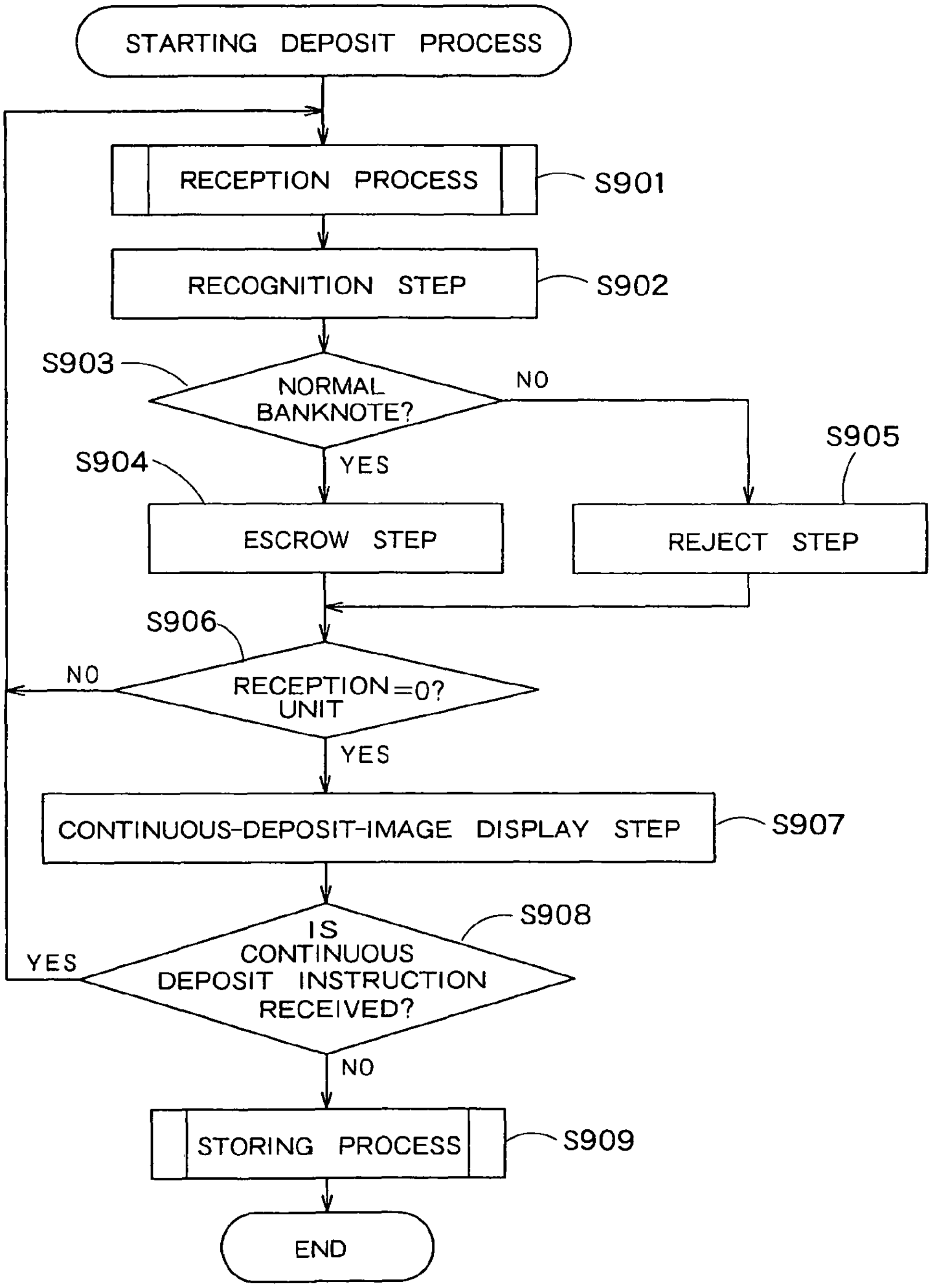
FIG. 9 is a flowchart showing a process procedure of a deposit process in an embodiment 4 according to the present invention.

FIG. 9 is a flowchart showing a process procedure of the deposit process in the embodiment 4 according to the present invention.

As shown in FIG. 9, at first, a reception step (S901) is performed. The reception step (S901) is performed in the same manner as the reception step of the embodiment 1 (FIG. 4).

Subsequently, a recognition step (S902) is performed. In the recognition step (S902), the recognition unit 12 recognizes each of the banknotes that have been received at the reception step (S404 of FIG. 4), and sends the recognition result to the control unit 102. At this time, the control unit 102 judges each of the banknotes as a "normal banknote" or a "reject banknote" based on the recognition result. In addition, the control unit 102 writes in the storage unit 101 the number of "normal banknotes" for each denomination or the reject factor of the "reject banknote".

When a "normal banknote" is judged by the control unit 102 (S903-YES), an escrow step (S904) is performed. In the escrow step (S904), the control unit 102 causes the banknote judged as the "normal banknote" to be escrowed in the first cassette 131.

On the other hand, when a "reject banknote" is judged by the control unit 102 (S903-NO), a reject step (S905) is performed. In the reject step (S905), the control unit 102 causes the banknote judged as the "reject banknote" to be stacked in the reject unit 14.

The steps S901 to S905 are repeatedly performed until the banknotes that have been put in the reception unit 11 finish going away therefrom (S906-NO).

When the banknotes that have been put in the reception unit 11 finish going away therefrom (S906-YES), a continuous-deposit-image display step (S907) is performed. In the continuous-deposit-image display step (S907), the control unit 102 causes the display unit 152 to display a continuous-deposit image including: the number of banknotes that have been escrowed in the first cassette 131, a message promoting a deposit confirmation instruction for fixing the process contents of the deposit process, and a message promoting an additional deposit (putting-in) of banknotes into the reception unit 11.

When a continuous deposit instruction is received by the operation unit 151 and the operator puts additional banknotes into the reception unit 11 (S908-YES), the process procedure returns to the step S901.

On the other hand, when a deposit confirmation instruction is received by the operation unit 151 (S908-NO), a storing process (S909) is performed. The storing step (S909) is performed in the same manner as the storing step of the embodiment 1 (FIG. 5).

The deposit process of the embodiment 4 is finished after the storing step (S909).

According to the embodiment 4, a process in which banknotes whose number is the number of banknotes that can be put in the reception unit 11 are escrowed in the first cassette 131 is continuously performed, so that the deposit process of the banknotes whose number is larger than the number of banknotes that can be put in the reception unit 11 can be performed by just one transaction operation.

Embodiment 5

Next, another embodiment 5 of the present invention is explained. The embodiment 5 relates to an example of reconciliation process in which banknotes in one cassette among a plurality of cassettes, which are provided for storing the banknotes, are escrowed.

At first, the structure of a banknote handling system according to the embodiment 5 is described with reference to FIGS. 10 and 11.

Figure 10:
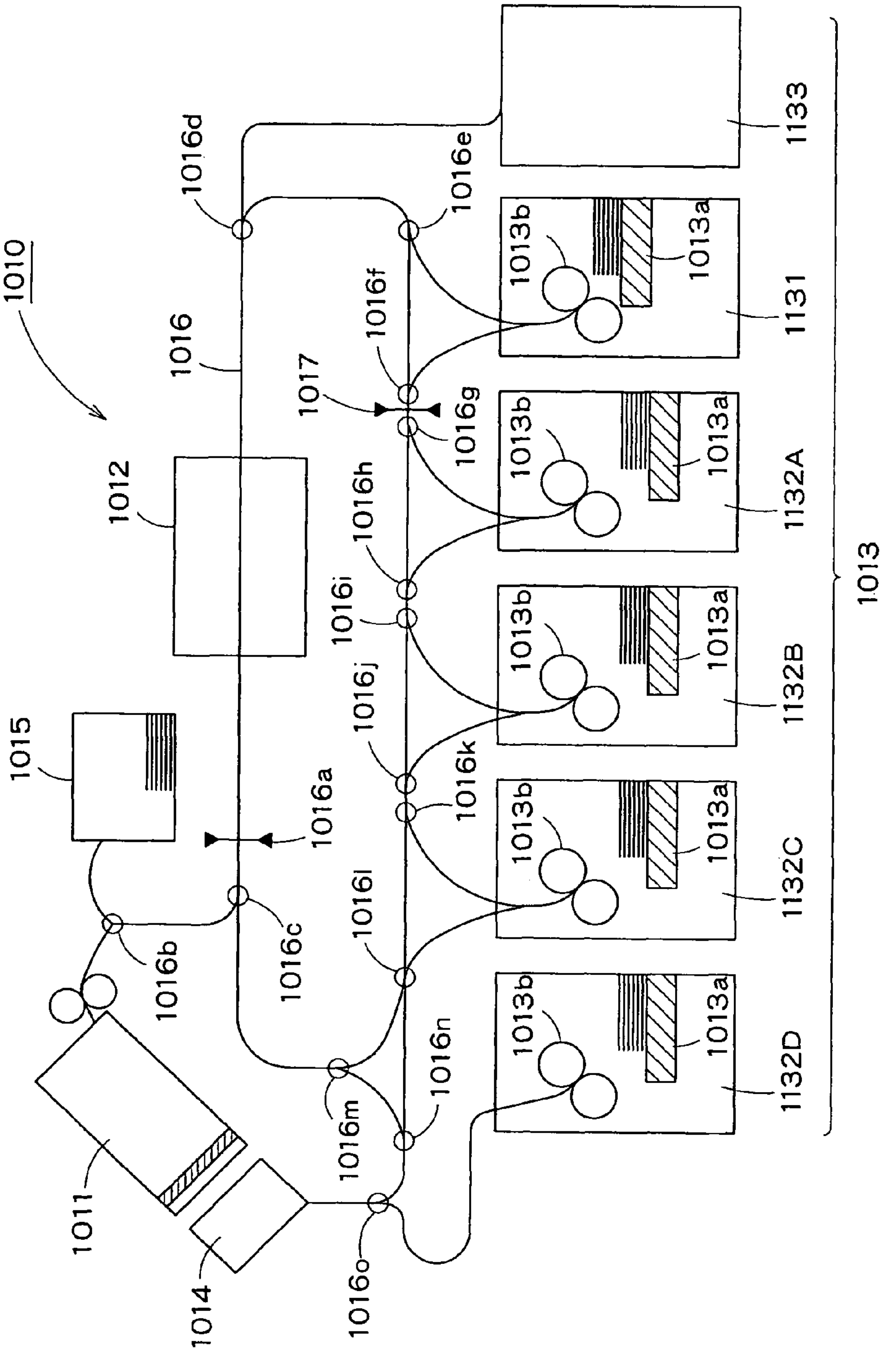
FIG. 10 is a schematic view showing an inside structure of a banknote handling system 1010 in an embodiment 5 according to the present invention.
Figure 11:
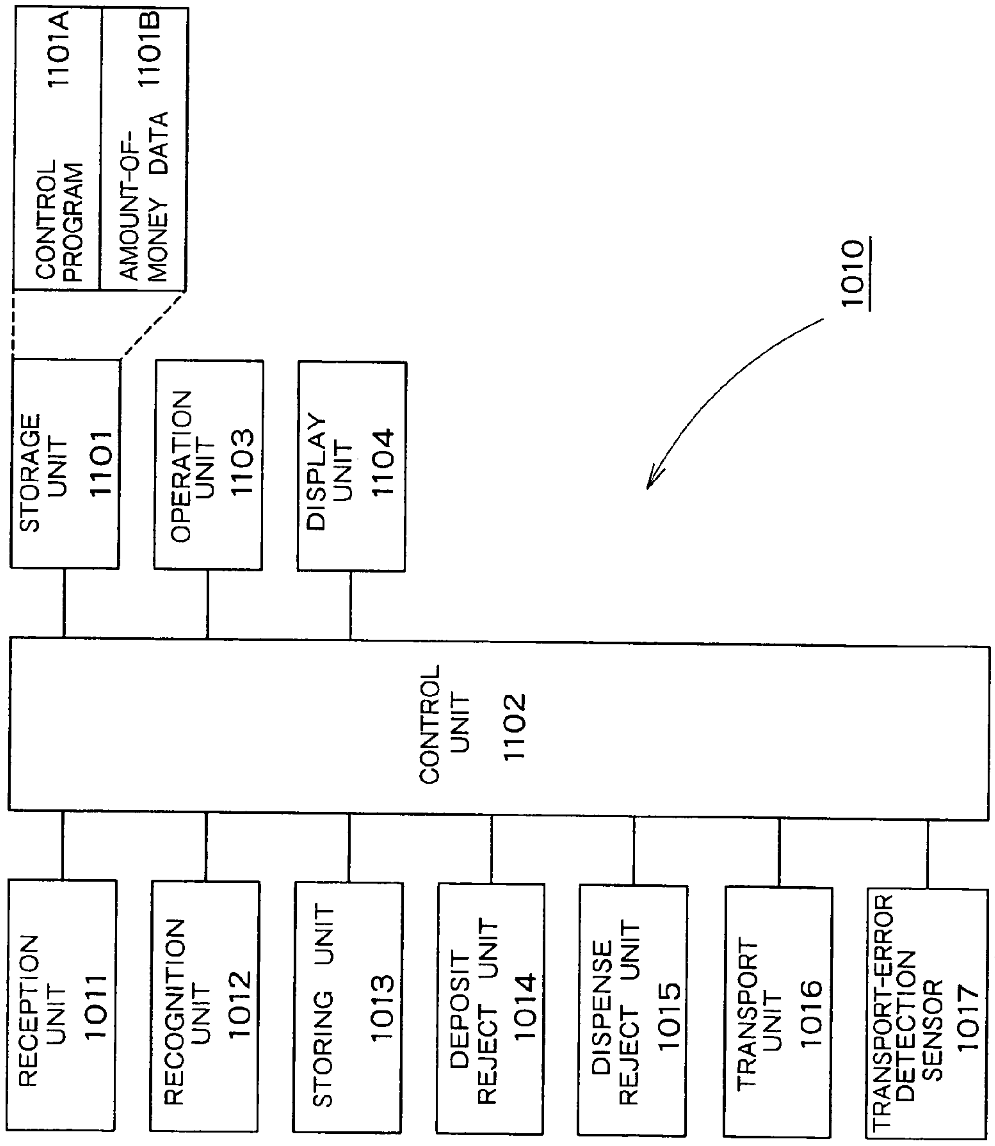
FIG. 11 is a block view showing a control block of the banknote handling system 1010 in the embodiment 5 according to the present invention.

FIG. 10 is a schematic view showing an inside structure of a banknote handling system 1010 in the embodiment 5 according to the present invention. FIG. 11 is a block view showing a control block of the banknote handling system 1010 in the embodiment 5 according to the present invention.

As shown in FIG. 10, the banknote handling system 1010 includes a reception unit 1011, a recognition unit 1012, a storing unit 1013, a deposit reject unit 1014, a dispense reject unit 1015, a transport unit 1016 and a transport-error detection sensor 1017. As shown in FIG. 11, the banknote handling system 1010 further includes a storage unit 1101, a control unit 1102, an operation unit 1103, and a display unit 1104.

The storage unit 1101 is configured to store a control program 1101A for the control unit 1102 and amount-of-money data 1101B of the banknotes stored in the storing unit 1013. In addition, the storage unit 1101 serves as a working memory of the control unit 1102.

The control unit 1102 is connected to the reception unit 1011, the recognition unit 1012, the storing unit 1013, the deposit reject unit 1014, the dispense reject unit 1015, the transport unit 1016, the transport-error detection sensor 1017, the storage unit 1101, the operation unit 1103 and the display unit 1104. Upon actuation of the control program 1101A stored in the storage unit 1101, the control unit 1102 is configured to control the reception unit 1011, the recognition unit 1012, the storing unit 1013, the deposit reject unit 1014, the dispense reject unit 1015, the transport unit 1016, the transport-error detection sensor 1017, the operation unit 1103 and the display unit 1104.

The reception unit 1011 includes a feeding roller for feeding out one by one the banknotes that the operator has put in the reception unit 1011. The feeding roller feeds out the put-in banknotes, so that the banknotes are received inside the banknote handling system 1010. In addition, the reception unit 1011 can stack, in a manner removable from the outside, banknotes to be dispensed at a dispense process. For example, the number of banknotes that the operator can put in the reception unit 1011 at one time (the number of banknotes that can be put in), or the number of banknotes that the reception unit 1011 can stack at one time, is five hundreds.

The recognition unit 1012 includes various sensors (for example, a line sensor) for recognizing denomination of each of the banknotes received by the reception unit 1011. In addition, when the recognition unit 1012 recognizes the denomination, the recognition unit 1012 sends the denomination as a recognition result to the control unit 1102. When a reject factor such as a transport error (a skewed state, a chained state or an overlapped state), a banknote error (counterfeit note or unfit note) or another recognition error is recognized, the recognition unit 1012 sends the reject factor as a recognition result to the control unit 1102. Then, the control unit 1102 judges the banknote whose denomination has been recognized as a "normal banknote", and the banknote whose reject factor has been recognized as a "reject banknote".

The storing unit 1013 is formed of a first cassette 1131, a plurality of second cassettes 1132A to 1132D, and an additional cassette space 1133. The first cassette 1131 includes: a storing mechanism 1013*a* for escrowing or storing the banknote that has been recognized as a "normal banknote" by the control unit 1102; and a feeding roller 1013*b* for feeding out the escrowed banknote(s) one by one. Each of the second cassettes 1132A to 1132D includes: a storing mechanism 1013*a* for storing the banknote that has been recognized as a "normal banknote" by the control unit 1102; and a feeding roller 1013*b* for feeding out the stored banknote(s) one by one. The first cassette 1131 and the second cassettes 1132A to 1132D are drawable from the outside. An additional-cassette space 1133 is provided in such a manner that another cassette including the same structure as that of the first cassette 1131 or one of the second cassettes 1132A to 1132D can be added in the additional-cassette space 1133 from the outside. The maximum capacity of each of the first cassette 1131 and the second cassettes 1132A to 1132D is common (the same), for example 3000 as the number of banknotes. The respective maximum capacities of the first cassette 1131 and the second cassettes 1132A to 1132D can be freely changed as long as they are larger than the number of banknotes that can be put in the reception unit 1011.

The deposit reject unit 1014 has: a stacking mechanism for stacking banknotes judged as reject banknotes during a deposit process; and a feeding roller for feeding out the stacked banknotes one by one. The deposit reject unit 1014 is configured in such a manner that the stacked banknotes are removable from the outside.

The dispense reject unit 1015 has: a stacking mechanism for stacking banknotes judged as reject banknotes by the control part 1102 during a dispense process or a reconciliation process; and a feeding roller for feeding out the stacked banknotes one by one. The dispense reject unit 1015 is configured in such a manner that the stacked banknotes are removable from the outside.

The transport unit 1016 is formed of transport belts, transport-path rollers, a diverter-timing detection sensor 1016*a*, diverters 1016*b* to 1016*c*, and motors for driving these elements, which are arranged for transporting the banknotes between the reception unit 1011, the recognition unit 1012, the first cassette 1131, the second cassettes 1132A to 1132D, the deposit reject unit 1014 and the dispense reject unit 1015.

The transport-error detection sensor 1017 is a transport-error detection unit configured to detect a reconciliation transport error (a chained state, a skewed state, an overlapped state or a banknote interval) between a diverter 1016*g* and another diverter 1016*f* regarding the banknotes fed out from any of the second cassettes 1132A to 1132D in the reconciliation process.

The operation unit 1103 has various keys for receiving an instruction (a deposit instruction, a reconciliation instruction or the like) from the operator.

The display unit 1104 has a liquid crystal display for displaying various information (reconciliation result or the like) to the operator.

Next, an operation of the banknote handling system 1010 in the embodiment 5 according to the present invention will be described with reference to FIG. 10.

As shown in FIG. 10, in a deposit process by the banknote handling system 1010, the banknotes that have been put in the reception unit 1011 are fed out to the transport unit 1016 by means of the feeding roller of the reception unit 1011. The banknotes fed out by this feeding roller are recognized by the recognition unit 1012. The banknotes whose denomination has been recognized by the recognition unit 1012 are escrowed in the first cassette 1131. The banknotes whose reject factor has been recognized by the recognition unit 1012 are stacked in the deposit reject unit 1014. The banknotes that have been escrowed in the first cassette 1131 are fed out to the transport unit 1016 by means of the feeding roller 1013*b* of the first cassette 1131, after a deposit confirmation instruction is received by the operation unit 1014. The banknotes fed out by this feeding roller 1013*b* are transported to any of the second cassettes 1132A to 1132D by means of the transport unit 1016. The banknotes are stored in the second cassettes 1132A to 1132D depending on their denomination.

In addition, in a dispense process by the banknote handling system 1010, the banknotes that have been stored in the second cassettes 1132A to 1132D are fed out to the transport unit 1016 by means of their feeding rollers 1013*b*. The banknotes fed out by their feeding rollers 1013*b* are recognized by the recognition unit 1012. The banknotes whose denomination has been recognized by the recognition unit 1012 are dispensed to the outside via the reception unit 1011. The banknotes whose reject factor has been recognized are stacked in the dispense reject unit 1015.

In addition, in a reconciliation process by the banknote handling system 1010, the banknotes that have been stored in the second cassettes 1132A to 1132D are fed out to the transport unit 1016 by means of their feeding rollers 1013*b*. The banknotes fed out by their feeding rollers 1013*b* are subject to a detection of a reconciliation transport error between the diverter 1016*g* and the diverter 1016*f* by the transport error detection sensor 1017. The banknotes whose reconciliation transport error has not been detected by the transport error detection sensor 1017 are escrowed in the first cassette 1131, and the banknotes whose reconciliation transport error has been detected are stacked in the dispense reject unit 1015.

Next, process contents of the banknote handling system 1010 in the embodiment 5 according to the present invention will be described with reference to FIGS. 12 to 20.

Figure 12:
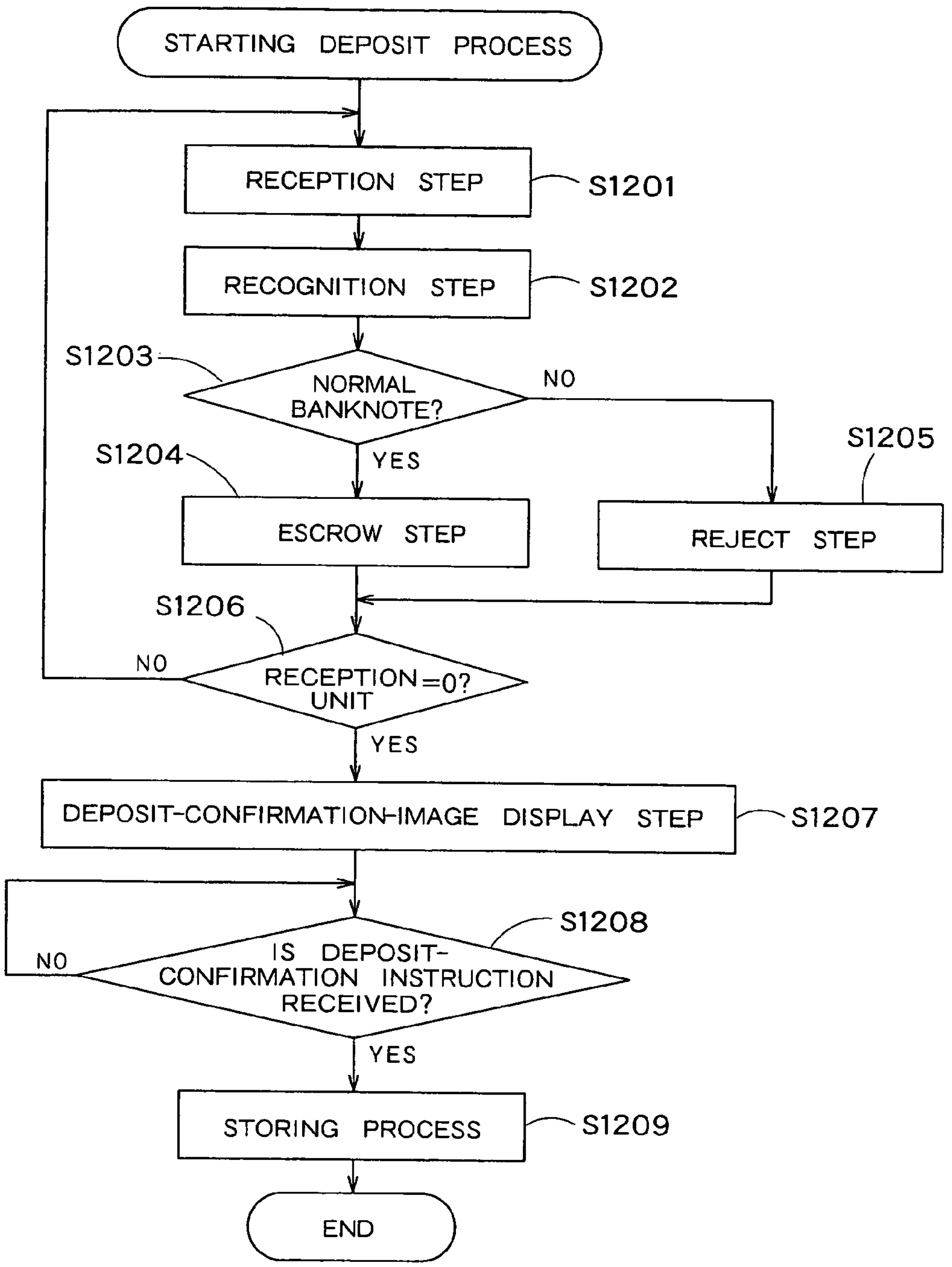
FIG. 12 is a flowchart showing a process procedure of a deposit process in the embodiment 5 according to the present invention.

FIG. 12 is a flowchart showing a process procedure of a deposit process in the embodiment 5 according to the present invention.

At first, as shown in FIG. 12, a reception step (S1201) is performed. In the reception step (S1201), the reception unit 1011 receives the put-in banknotes inside the banknote handling system 1010.

Next, a recognition step (S1202) is performed. In the recognition step (S1202), the recognition unit 1012 recognizes each of the banknotes that have been received by the reception unit 1011 at the reception step (S1201), and sends the recognition result to the control unit 1102. At this time, the control unit 1102 judges each of the banknotes as a "normal banknote" or a "reject banknote" based on the recognition result. In addition, the control unit 1102 writes in the storage unit 1101 the number of "normal banknotes" for each denomination or the reject factor of the "reject banknote".

When a "normal banknote" is judged by the control unit 1102 (S1203-YES), an escrow step (S1204) is performed. In the escrow step (S1204), the control unit 1102 causes the banknote judged as the "normal banknote" to be escrowed in the first cassette 1131.

On the other hand, when a "reject banknote" is judged by the control unit 1102 (S1203-NO), a reject step (S1205) is performed. In the reject step (S1205), the control unit 1102 causes the banknote judged as the "reject banknote" to be stacked in the reject unit 1014.

The steps S1201 to S1205 are repeatedly performed until the banknotes that have been put in the reception unit 1011 finish going away therefrom (S1206-NO).

When the banknotes that have been put in the reception unit 1011 finish going away therefrom (S1206-YES), a deposit-confirmation-image display step (S1207) is performed. In the deposit-confirmation-image display step (S1207), the control unit 1102 causes the display unit 1104 to display a deposit-confirmation image including a message representing the number of banknotes that have been escrowed in the first cassette 1131 and a message promoting a deposit confirmation instruction for fixing the process contents of the deposit process.

When a deposit confirmation instruction is received by the operation unit 1103 (S1208-YES), a storing step (S1209) is performed. In the storing step (S1209), the control unit 1102 causes the banknotes that have been escrowed in the first cassette 1131 to be stored in any of the second cassettes 1132A to 1132D. At this time, the control unit 1102 updates the amount-of-money data 1101B of the respective second cassettes 1132A to 1132D.

The deposit process of the embodiment 5 of the present invention is finished after the storing step (S1209).

Figure 13:
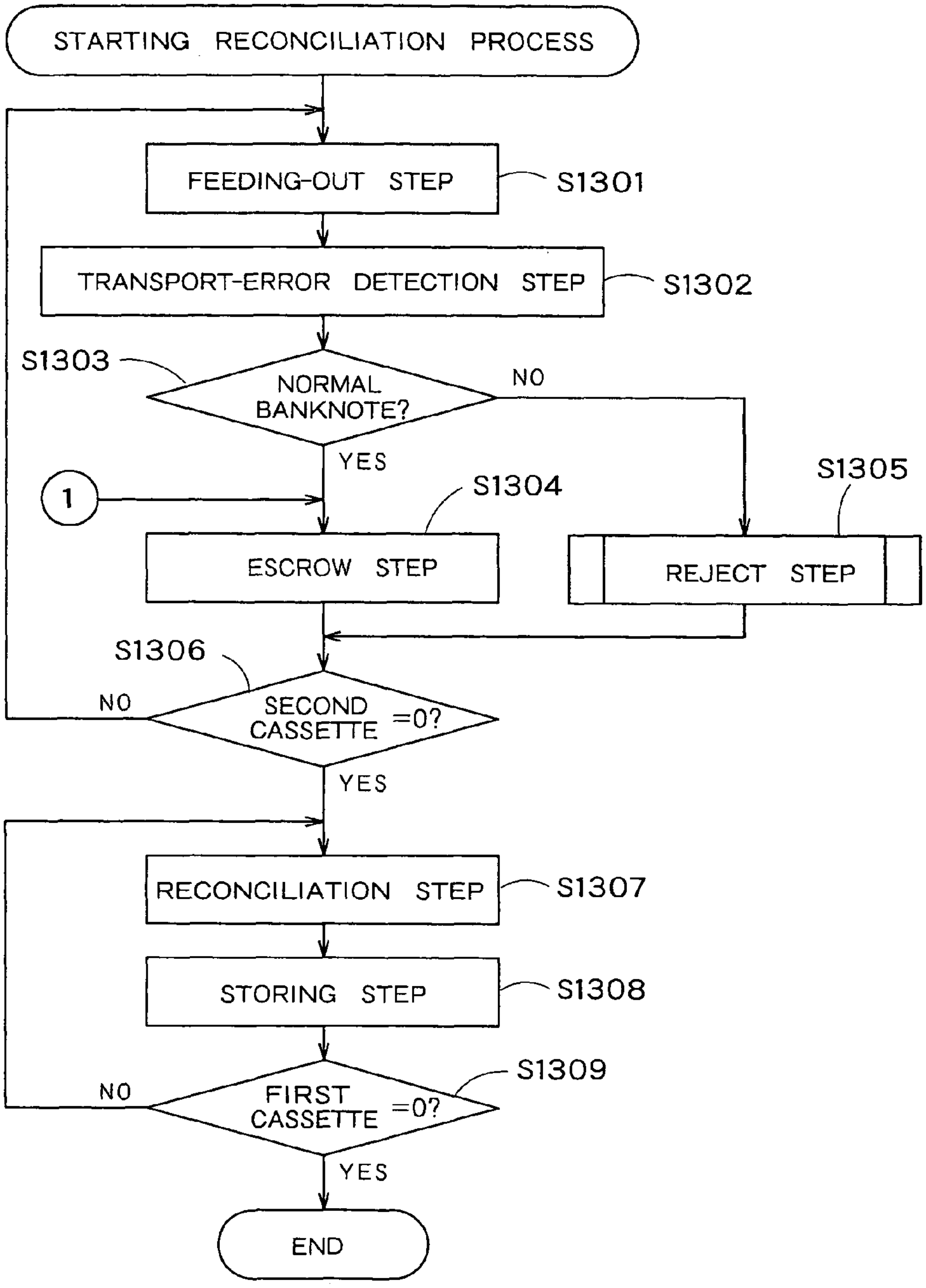
FIG. 13 is a flowchart showing a process procedure of a reconciliation process in the embodiment 5 according to the present invention.

FIG. 13 is a flowchart showing a process procedure of the reconciliation process in the embodiment 5 according to the present invention. The reconciliation process is performed when a reconciliation instruction from the operator is received by the operation unit 1103 or on a date and a time that have been determined for a reconciliation process.

Figure 14:
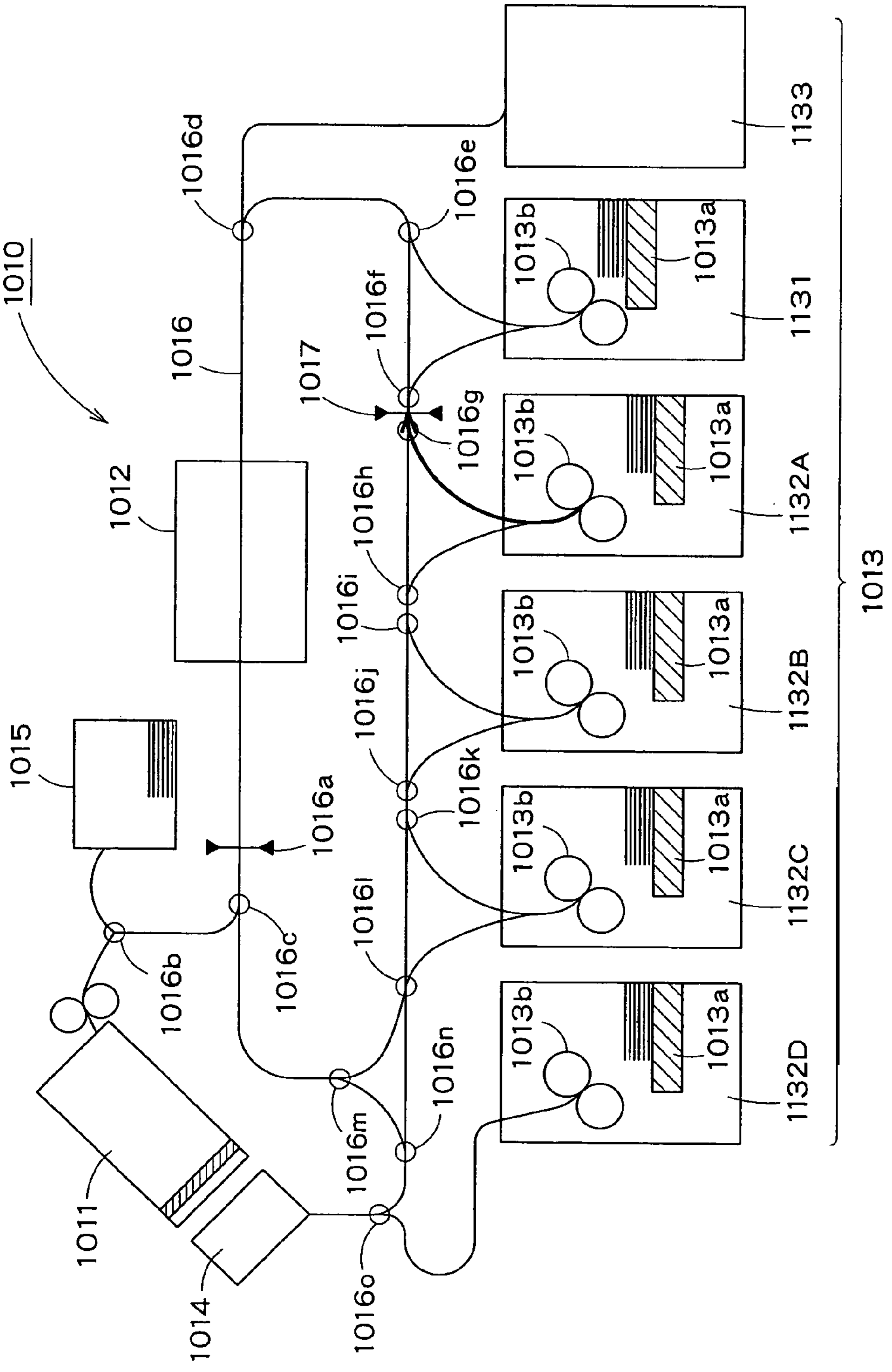
FIG. 14 is a schematic view showing a transport path of the reconciliation process in the embodiment 5 according to the present invention.

As shown in FIG. 13, at first, a feeding-out step (S1301) is performed. In the feeding-out step (S1301), as shown in FIG. 14, the control unit 1102 causes the banknotes that have been stored in the second cassettes 1132A to 1132D to be fed out to the transport path 1016.

Next, a transport-error detection step (S1302) is performed. In the transport-error detection step (S1302), the transport-error detection sensor 1017 detects a reconciliation transport error between the diverter 1016*g* and the diverter 1016*f* regarding the banknotes fed out by the feeding-out rollers 1013*b* at the feeding-out step (S1301), and sends the detection result to the control unit 1102. At this time, the control unit 1102 judges each of the banknotes as a "normal banknote" or a "reject banknote" based on the detection result.

Figure 15:
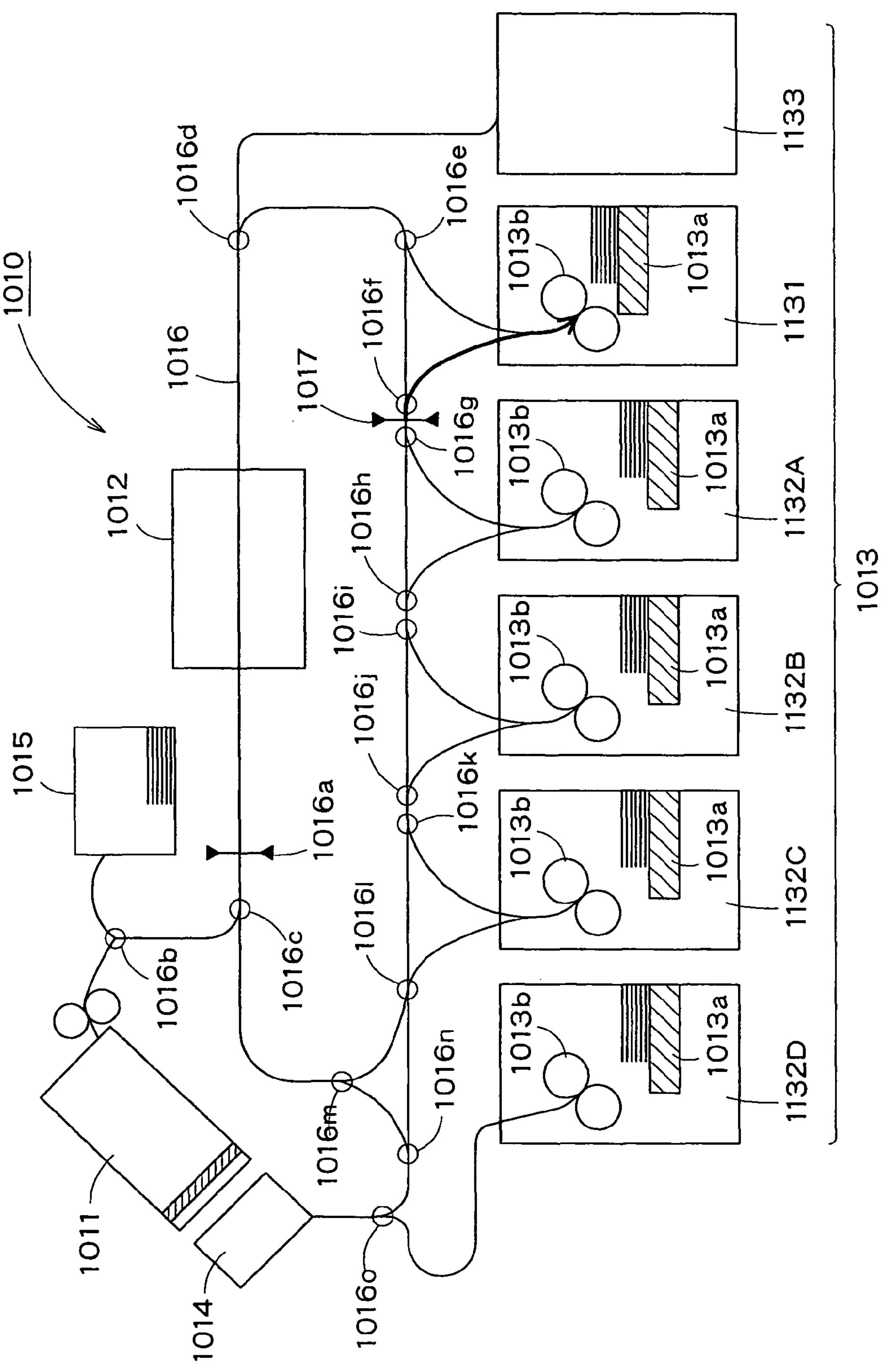
FIG. 15 is a schematic view showing another transport path of the reconciliation process in the embodiment 5 according to the present invention.

When a "normal banknote" is judged by the control unit 1102 (S1303-YES), an escrow step (S1304) is performed. In the escrow step (S1304), as shown in FIG. 15, the control unit 102 causes the banknote judged as the "normal banknote" to be escrowed in the first cassette 1131.

On the other hand, when a "reject banknote" is judged by the control unit 1102 (S1303-NO), a reject process (S1305) is performed.

Figure 16:
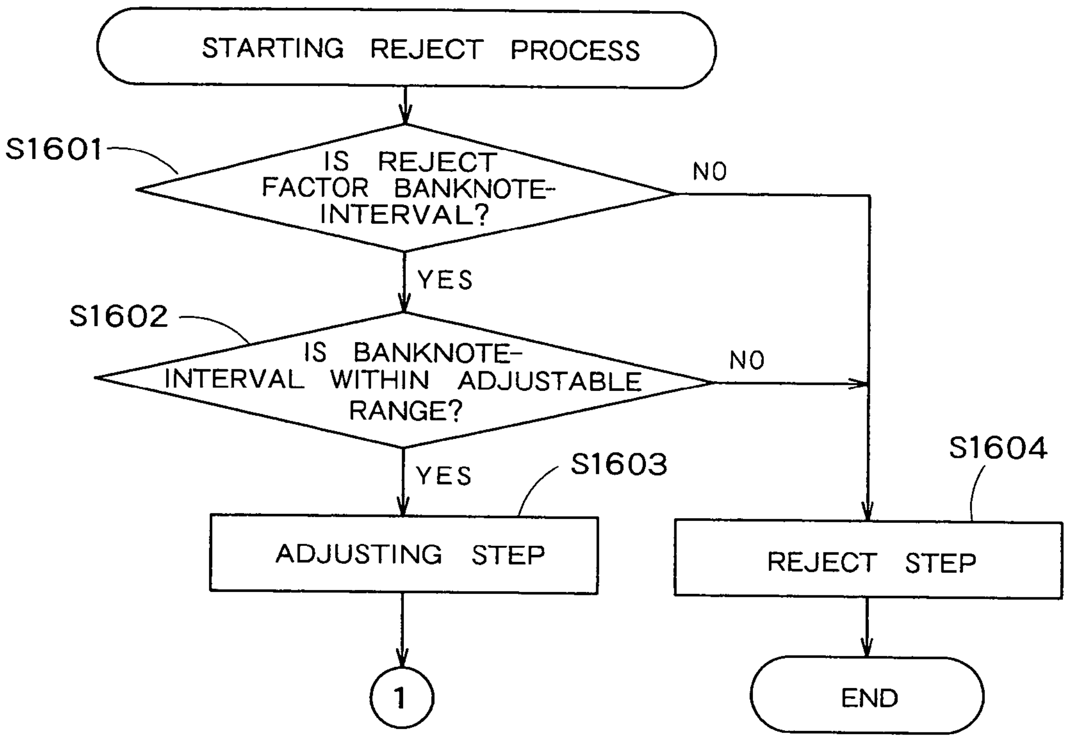
FIG. 16 is a flowchart showing a process procedure of a reject process (S1305) of FIG. 13.

FIG. 16 is a flowchart showing a process procedure of the reject process (S1305) of FIG. 13.

As shown in FIG. 16, at first, an interval between each two subsequent transported banknotes is detected by a light-blocking sensor or the like, which is not shown. When the reject factor is that the banknote interval is smaller than a predetermined interval (banknote-interval error) (S1601-YES), and when the banknote interval falls within an adjustable range (S1602-YES), an adjusting step (S1603) is performed. In the adjusting step (S1603), the control unit 1102 adjusts the banknote interval by expanding the banknote interval by changing the transport speeds of two subsequent transport paths. After the adjusting step (S1603), the process goes to the escrow step (S1304) of FIG. 13.

Figure 17:
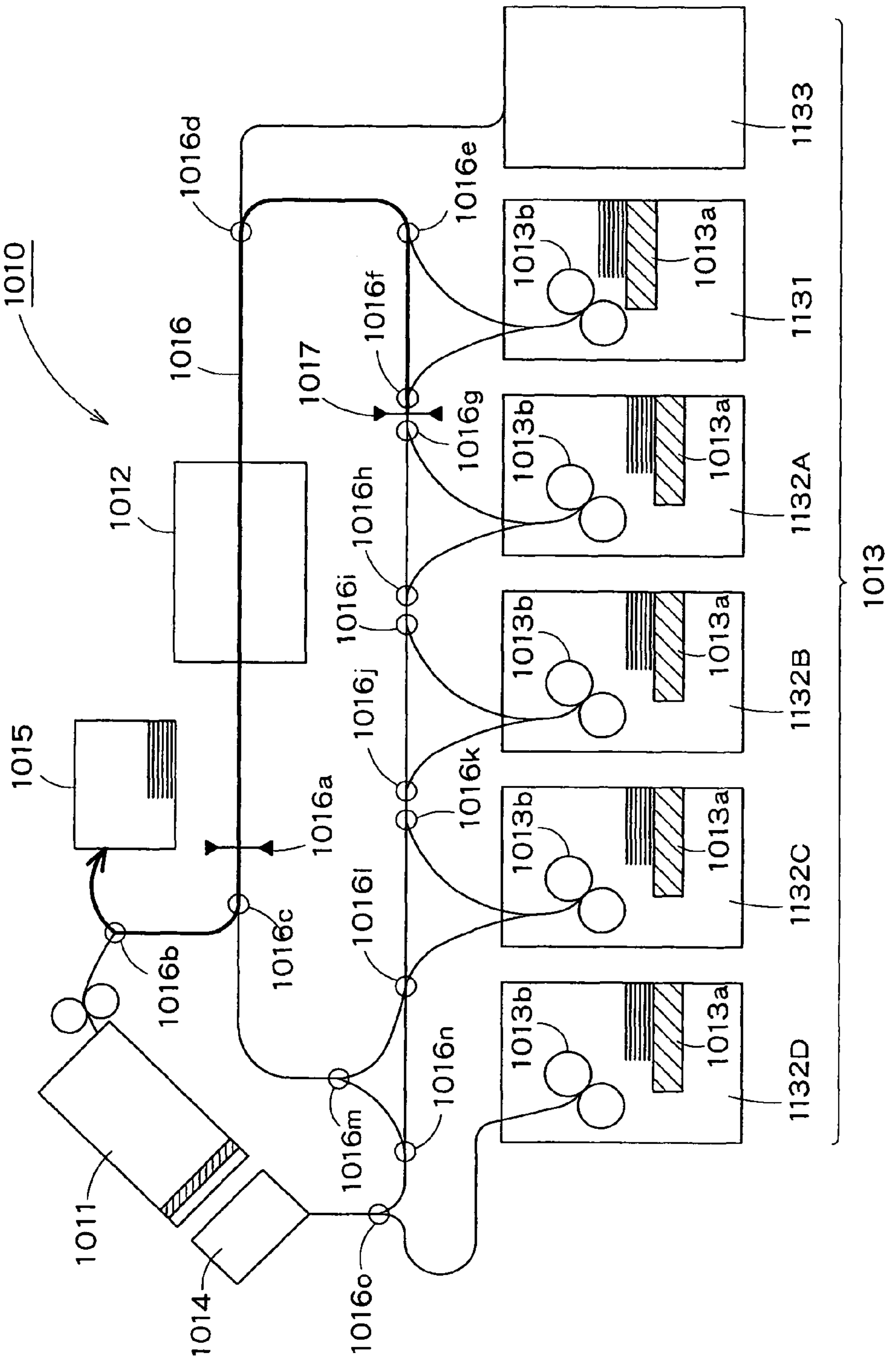
FIG. 17 is a schematic view showing another transport path of the reconciliation process in the embodiment 5 according to the present invention.

On the other hand, when the reject factor is a banknote-interval error (S1601-YES) and the banknote interval doesn't fall within the adjustable range (S1602-NO), or when the reject factor is a chained-state error or a skewed-state error (S1601-NO), a reject step (S1604) is performed. In the reject step (S1604), as shown in FIG. 17, the control unit 1102 stacks the banknotes judged as "reject banknotes" in the dispense reject unit 1015.

The reject process (S1305) of FIG. 13 is finished after the reject step (S1604).

As shown in FIG. 13, the steps S1301 to S1305 are repeatedly performed until the banknotes that have been stored in the second cassettes 1132A to 1132D finish going away therefrom (S1306-NO).

Figure 18:
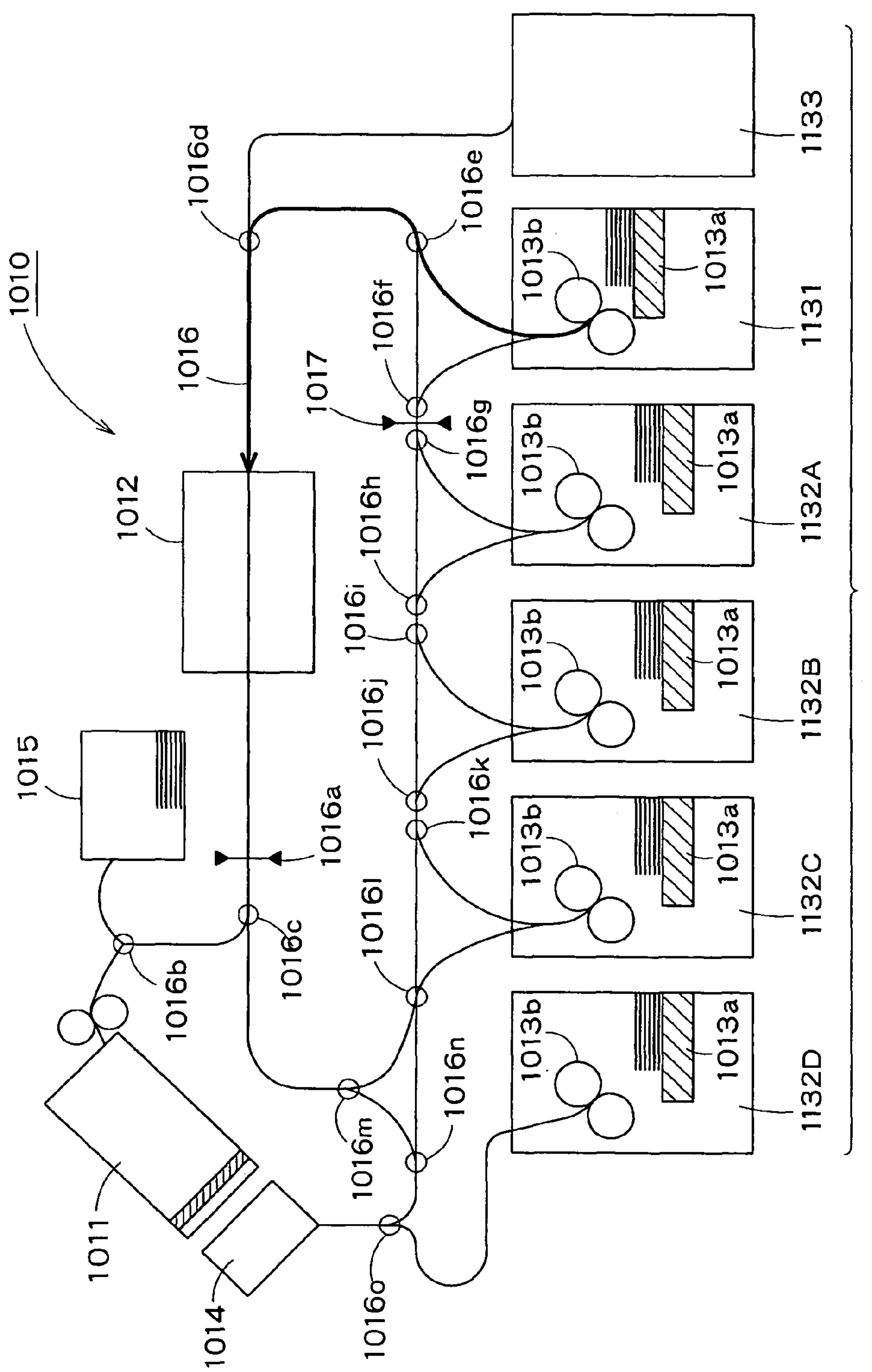
FIG. 18 is a schematic view showing another transport path of the reconciliation process in the embodiment 5 according to the present invention.

When the banknotes that have been stored in the second cassettes 1132A to 1132D finish going away therefrom (S1306-YES), a reconciliation step (S1307) is performed. In the reconciliation step (S1307), as shown in FIG. 18, the control until 1102 causes the banknotes that have been escrowed in the first cassette 1131 at the escrow step (S1304) to be fed out to the transport path 16. Then, the recognition unit 1012 recognizes each of the banknotes, and sends the recognition result to the control unit 1102. At this time, the control unit 1102 compares the recognition result of the recognition unit 1012 and the amount-of-money data 1101B stored in the storage unit 1101, writes in the storage unit 1101 the comparison result as a reconciliation result, and causes the display unit 1104 to display the reconciliation result.

Figure 19:
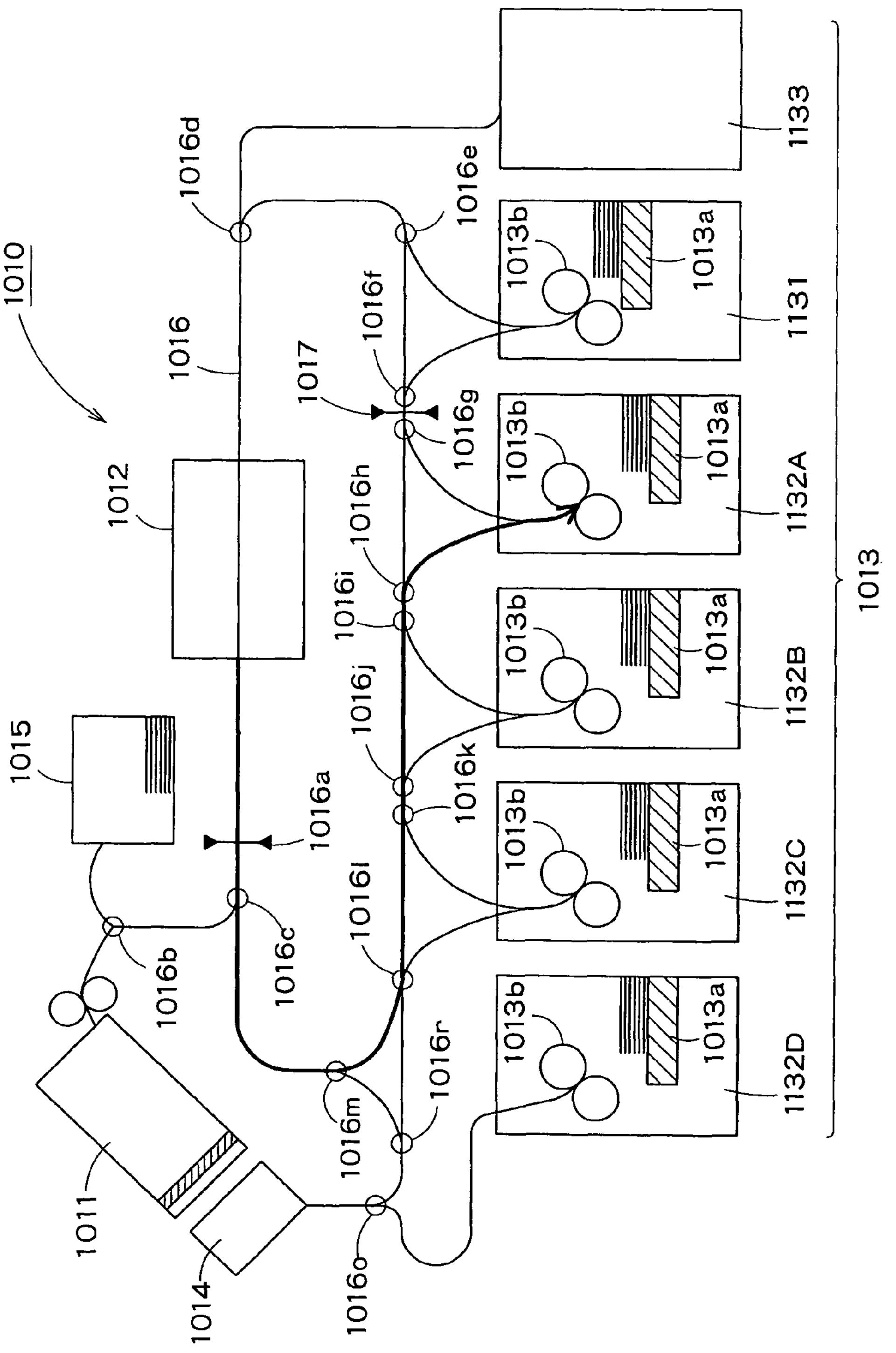
FIG. 19 is a schematic view showing another transport path of the reconciliation process in the embodiment 5 according to the present invention.

Then, a storing step (S1308) is performed. In the storing step (S1308), as shown in FIG. 19, the control unit 1102 causes the banknotes that have been recognized by the recognition unit 1012 at the reconciliation step (S1307) to be stored in the second cassettes 1132A to 1132D.

The steps S1307 to S1308 are repeatedly performed until all the banknotes that have been escrowed in the first cassette 1131 finish being fed out (S1309-NO). The deposit process of the embodiment 5 is finished when all the banknotes that have been escrowed in the first cassette 1131 finish being fed out (S1309-YES).

Figure 20:
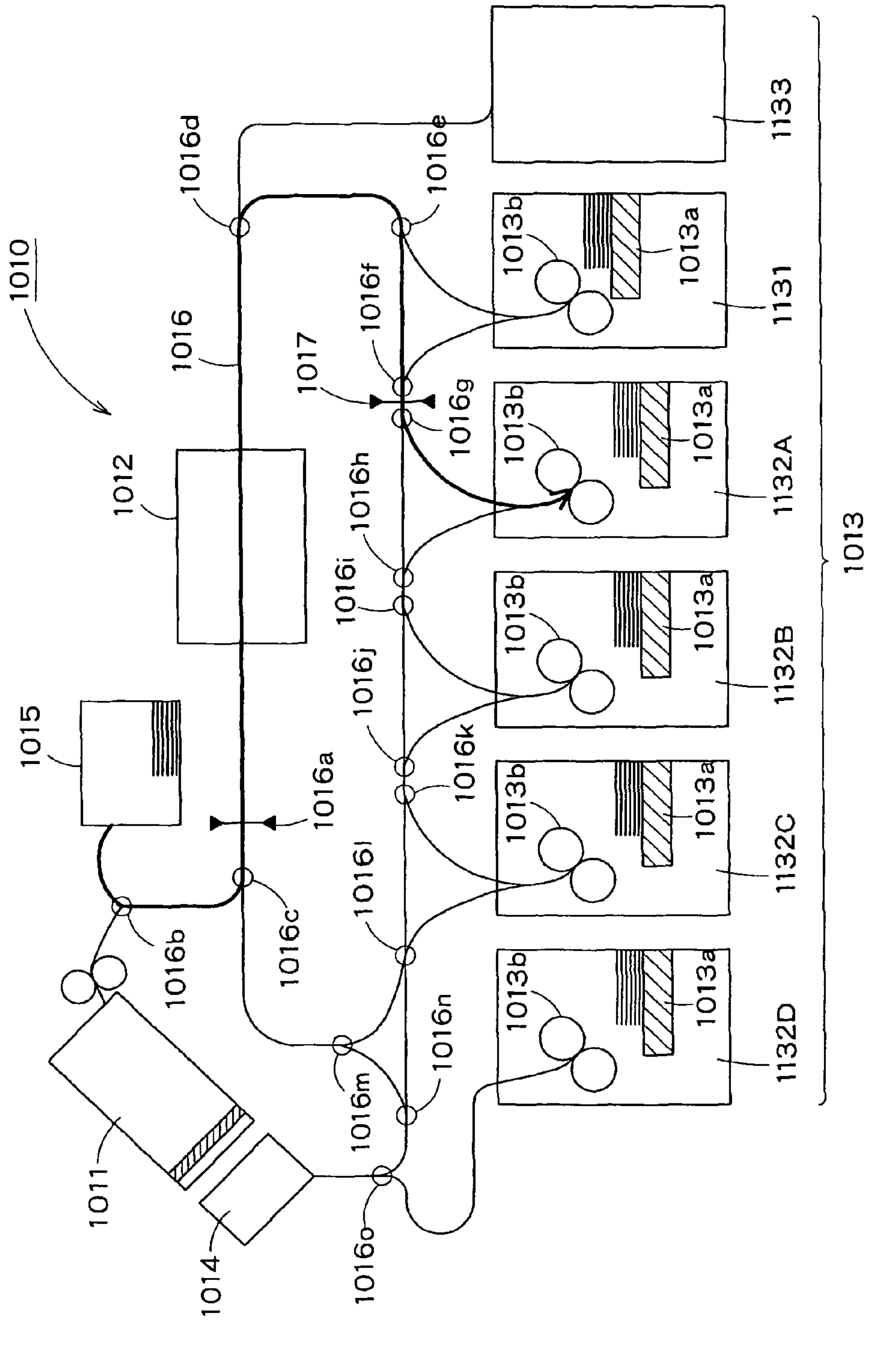
FIG. 20 is a schematic view showing a transport path of a reconciliation process in a modified example of the embodiment 5 according to the present invention.

In addition, in a modified example of the embodiment 5, as shown in FIG. 20, after the reconciliation process of FIG. 13, the control unit 1102 may control the dispense reject unit 1015 to feed out the banknotes stacked at the reject step (S1604), and then the recognition unit 1012 may perform the same step as the reconciliation step of FIG. 13 for the fed-out banknotes. At this time, the control unit 1102 causes the banknotes recognized by the recognition unit 1012 (banknotes fed out by the dispense reject unit 1015) to be stored in the second cassettes 1132A to 1132D.

In the embodiment 5 of the present invention, the number of the second cassettes 1132A to 1132D is four. However, the present invention is not limited thereto.

According to the embodiment 5, when the banknotes that have been stored in the second cassettes 1132A to 1132D are escrowed in the first cassette 1131 for the reconciliation process, banknotes whose reconciliation transport error is detected between the second cassettes 1132A to 1132D and the first cassettes 113 are stacked in the dispense reject unit 1015. Thus, another escrow step or another reconciliation step for the banknotes suffering from the reconciliation transport error can be omitted, so that the time required for the reconciliation process can be reduced.

In addition, according to the embodiment 5, when the banknotes that have been stored in the second cassettes 1132A to 1132D are escrowed in the first cassette 1131 for the reconciliation process, the transport-error detection step is performed without transporting the banknotes through the recognition unit 1012. Thus, the transport distance of the banknotes can be shortened, so that the time required for the reconciliation process can be reduced.

In addition, according to the embodiment 5, when the reconciliation transport error is a banknote-interval error, the banknote interval may be adjusted. Thus, probability of occurrence of a reconciliation transport error can be reduced.

Embodiment 6

Next, another embodiment 6 of the present invention is explained. The embodiment 6 relates to an example in which a recognition step by a recognition unit is omitted when banknotes escrowed in an escrow unit can be stored in one cassette all together collectively and in which amount-of-money data of a storing unit can be updated based on amount-of-money data of the escrow unit.

At first, the structure of a banknote handling system according to the embodiment 6 is described with reference to FIGS. 21 to 25.

Figure 21:
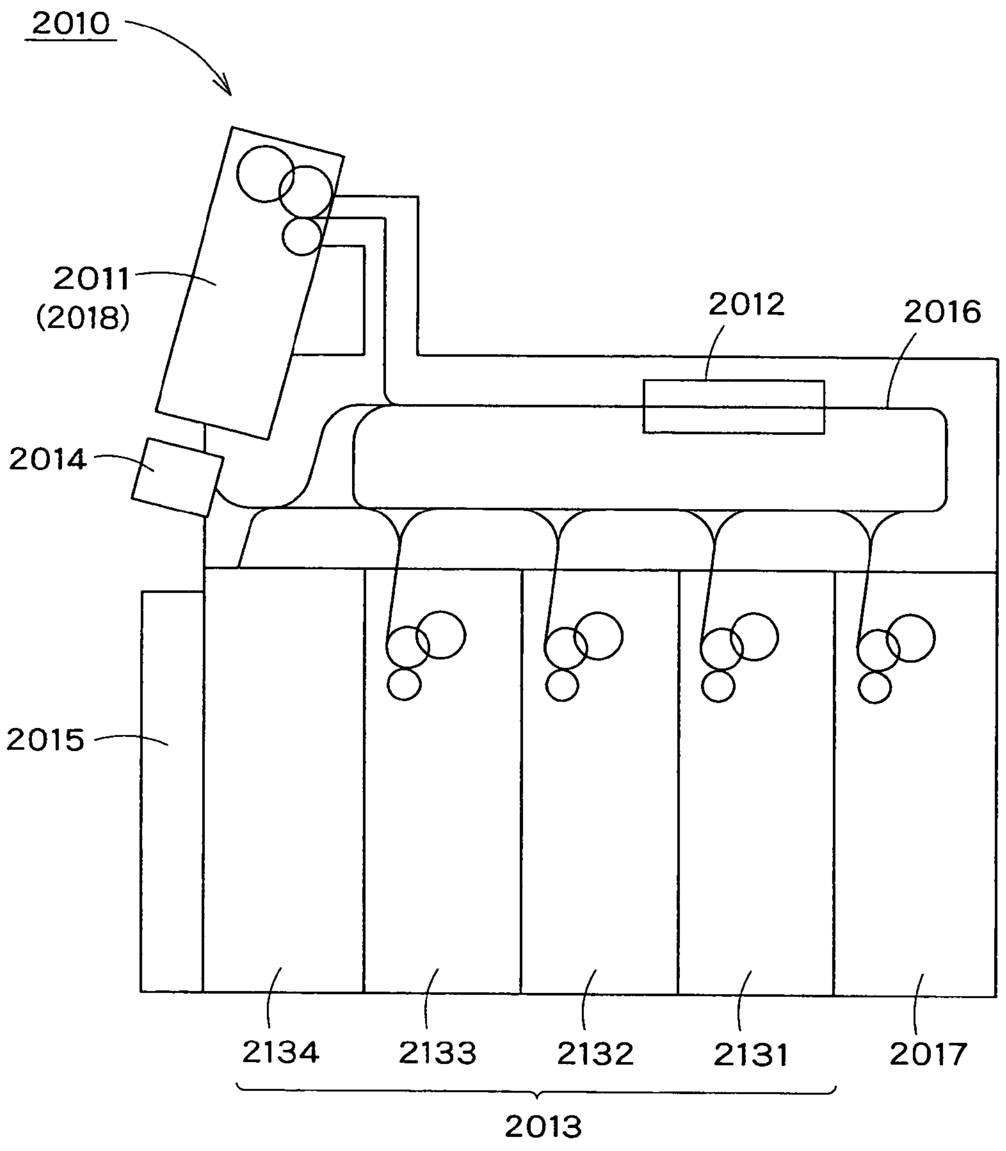
FIG. 21 is a schematic view showing an inside structure of a banknote handling system 2010 in an embodiment 6 according to the present invention.
Figure 22:
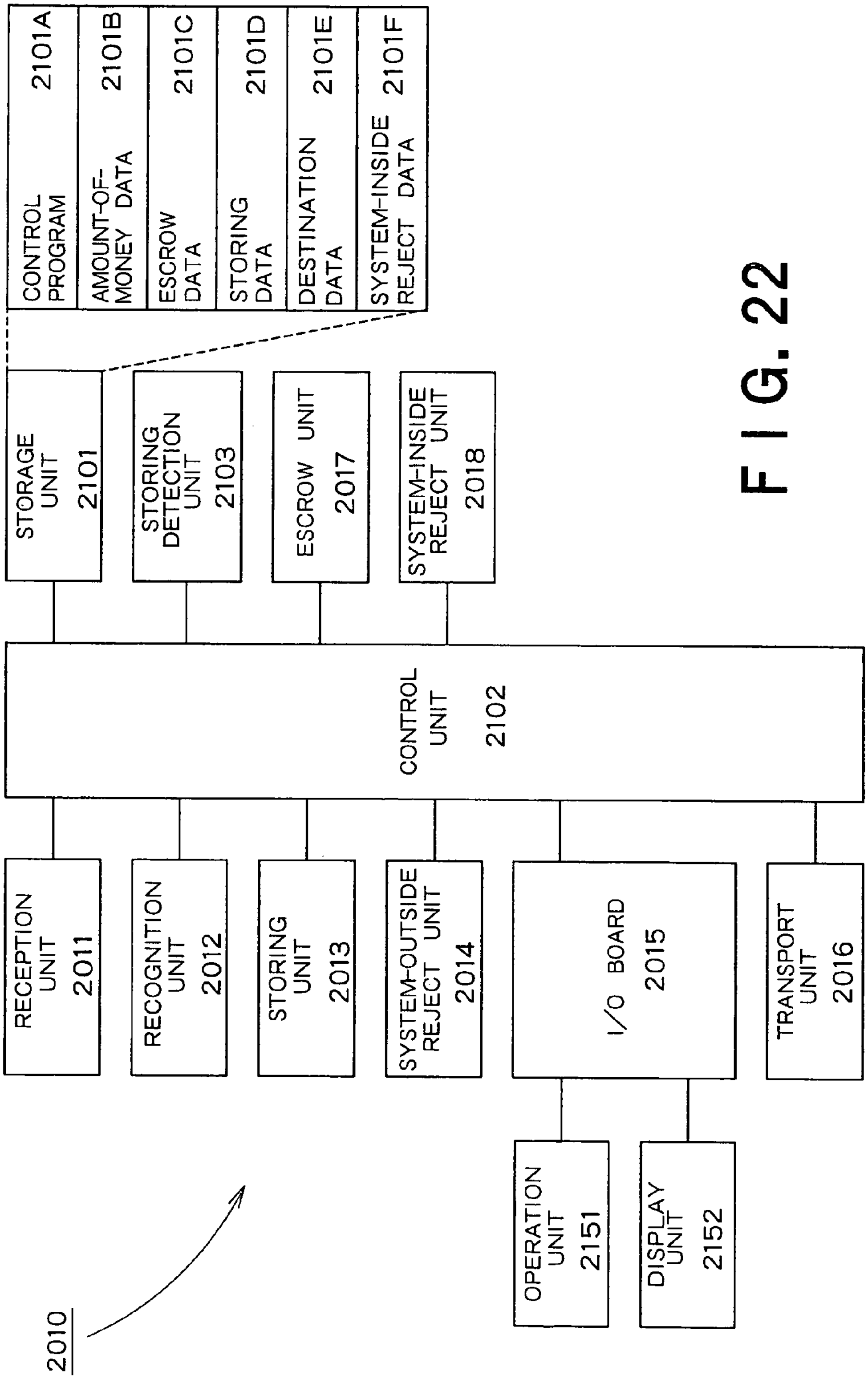
FIG. 22 is a block view showing a control block of the banknote handling system 2010 in the embodiment 6 according to the present invention.

FIG. 21 is a schematic view showing an inside structure of a banknote handling system 2010 in the embodiment 6 according to the present invention. FIG. 22 is a block view showing a control block of the banknote handling system 2010 in the embodiment 6 according to the present invention.

As shown in FIG. 21, the banknote handling system 2010 includes a reception unit 2011, a recognition unit 2012, a storing unit 2013, a system-outside reject unit 2014, an I/O board 2015, a transport unit 2016, an escrow unit 2017 and a system-inside reject unit 2018. As shown in FIG. 22, the banknote handling system 2010 further includes a storage unit 2101, a control unit 2102 and a storing detection unit 2103.

The storage unit 2101 is configured to store a control program 2101A for the control unit 2102, recognition data 2010B including a recognition result by the recognition unit 2012, escrow data 2010C including amount-of-money data of the escrow unit 2017, and storing data 2010D including amount-of-money data of each of the cassettes 2131 to 2133 of the storing unit 2013, destination data 2101E which will be described below, and system-inside reject date 2101F which also will be described below. In addition, the storage unit 2101 serves as a working memory of the control unit 2102.

As shown in FIG. 23, the recognition data 2101B includes the recognition result (denomination or reject factor) in the order of the recognition by the recognition unit 2012. As shown in FIG. 24, the escrow data 2010C includes the number of banknotes for each denomination escrowed in the escrow unit 2017. As shown in FIG. 25, the storing data 2101D includes the number of banknotes for each denomination for each of the cassettes 2131 to 2133.

The control unit 2102 is connected to the reception unit 2011, the recognition unit 2012, the storing unit 2013, the system-outside reject unit 2014, the I/O board 2015, the transport unit 2016, the escrow unit 2017, the system-inside reject unit 2018, the storage unit 2101, and the storing detection unit 2103. Upon actuation of the control program 2101A stored in the storage unit 2101, the control unit 2102 is configured to control the reception unit 2011, the recognition unit 2012, the storing unit 2013, the system-outside reject unit 2014, the I/O board 2015, the transport unit 2016, the escrow unit 2017, the system-inside reject unit 2018 and the storing detection unit 2103.

The reception unit 2011 includes a feeding roller for feeding out one by one the banknotes that the operator has put in the reception unit 2011. The feeding roller feeds out the put-in banknotes, so that the banknotes are received inside the banknote handling system 2010. For example, the number of banknotes that the operator can put in the reception unit 2011 at one time (the number of banknotes that can be put in) is five hundreds.

The recognition unit 2012 includes various sensors (for example, a line sensor) for recognizing denomination of each of the banknotes received by the reception unit 2011. In addition, when the recognition unit 2012 recognizes the denomination, the recognition unit 2012 sends the denomination as a recognition result to the control unit 2102. When a reject factor such as a transport error (a skewed state, a chained state or an overlapped state), a banknote error (a counterfeit note or a unfit note) or another recognition error is recognized, the recognition unit 2012 sends the reject factor as a recognition result to the control unit 2102. Then, the control unit 2102 judges the banknote whose denomination has been recognized as a "normal banknote", and the banknote whose reject factor has been recognized as a "reject banknote".

The storing unit 2013 is formed of cassettes 2131 to 2133 and a removable cassette 2134. Each of the cassettes 2131 to 2133 includes: a storing mechanism for storing the banknote that has been recognized as a "normal banknote" by the control unit 2102; and a feeding roller for feeding out the stored banknote(s) one by one. The cassettes 2131 to 2133 are drawable from the outside. The removable cassette 2134 is configured to store a banknote that has been recognized as a "reject banknote" by the control unit 2102 in a system-inside reject return process which will be described below. The maximum capacity of each of the cassettes 2131 to 2133 and the removable cassette 2134 is common (the same), for example 3000 as the number of banknotes. The respective maximum capacities of the cassettes 2131 to 2133 and the removable cassette 2134 can be freely changed as long as they are larger than the number of banknotes that can be put in the reception unit 2011.

The system-inside reject unit 2014 is configured to stack banknotes judged as reject banknotes by the control unit 2102. The system-inside reject unit 2014 is also configured in such a manner that the stacked banknotes are removable from the outside.

The I/O board 2015 is connected to an operation unit 2151 and a display unit 2152. The operation unit 2151 has various keys for receiving an instruction from the operator. The display unit 2152 has a liquid crystal display for displaying various information to the operator.

The transport unit 2016 is formed of transport belts, transport-path rollers, diverters and motors for driving these elements, which are arranged for transporting the banknotes between the reception unit 2011, the recognition unit 2012, the storing unit 2013, the system-outside reject unit 2014 and the escrow unit 2017.

The escrow unit 2017 includes: an escrow mechanism for escrowing the banknote that has been recognized as a "normal banknote" by the control unit 2102; and a feeding roller for feeding out the escrowed banknote(s) one by one. The maximum capacity of the escrow unit 2017 is the same as those of the cassettes 2131 to 2133 of the storing unit 2013, for example 3000 as the number of banknotes. The maximum capacity of the escrow unit 2017 can be freely changed as long as it is larger than the number of banknotes that can be put in the reception unit 2011.

The system-outside reject unit 2018 includes an escrow mechanism for escrowing reject banknotes, and a feeding roller for feeding out the escrowed banknote(s) one by one. The system-outside reject unit 2018 is provided integrally with the reception unit 2011.

The storing detection unit 2103 includes sensors and counters, for detecting the numbers of banknotes in the storing unit 2013 (the cassettes 2131 to 2133) and the escrow unit 2017. The storing detection unit 2103 is configured to send the detection result to the control unit 2102.

Next, an operation of the banknote handling system 2010 in the embodiment 6 according to the present invention will be described with reference to FIG. 21.

As shown in FIG. 21, in the banknote handling system 2010, the banknotes that have been put in the reception unit 2011 are fed out to the transport unit 2016 by means of the feeding roller of the reception unit 2011. The banknotes fed out by this feeding roller are recognized by the recognition unit 2012. The banknotes whose denomination has been recognized by the recognition unit 2012 are escrowed in the escrow unit 2017. The banknotes whose reject factor has been recognized by the recognition unit 2012 are stacked in the system-outside reject unit 2014. The banknotes that have been escrowed in the escrow unit 2017 are fed out to the transport unit 2016 by means of the feeding roller of the escrow unit 2017, after a deposit confirmation instruction is received by the operation unit 2151. The banknotes fed out by this feeding roller are transported to any of the cassettes 2131 to 2133 by means of the transport unit 2016. The banknotes are stored in the cassettes 2131 to 2133 in a denomination-mixed manner. Alternatively, instead of that, in the embodiment 6, the banknotes may be stored in the cassettes 2131 to 2133 depending on their denomination.

Next, process contents of the banknote handling system 2010 in the embodiment 6 according to the present invention will be described with reference to FIGS. 26 to 32.

Figure 26:
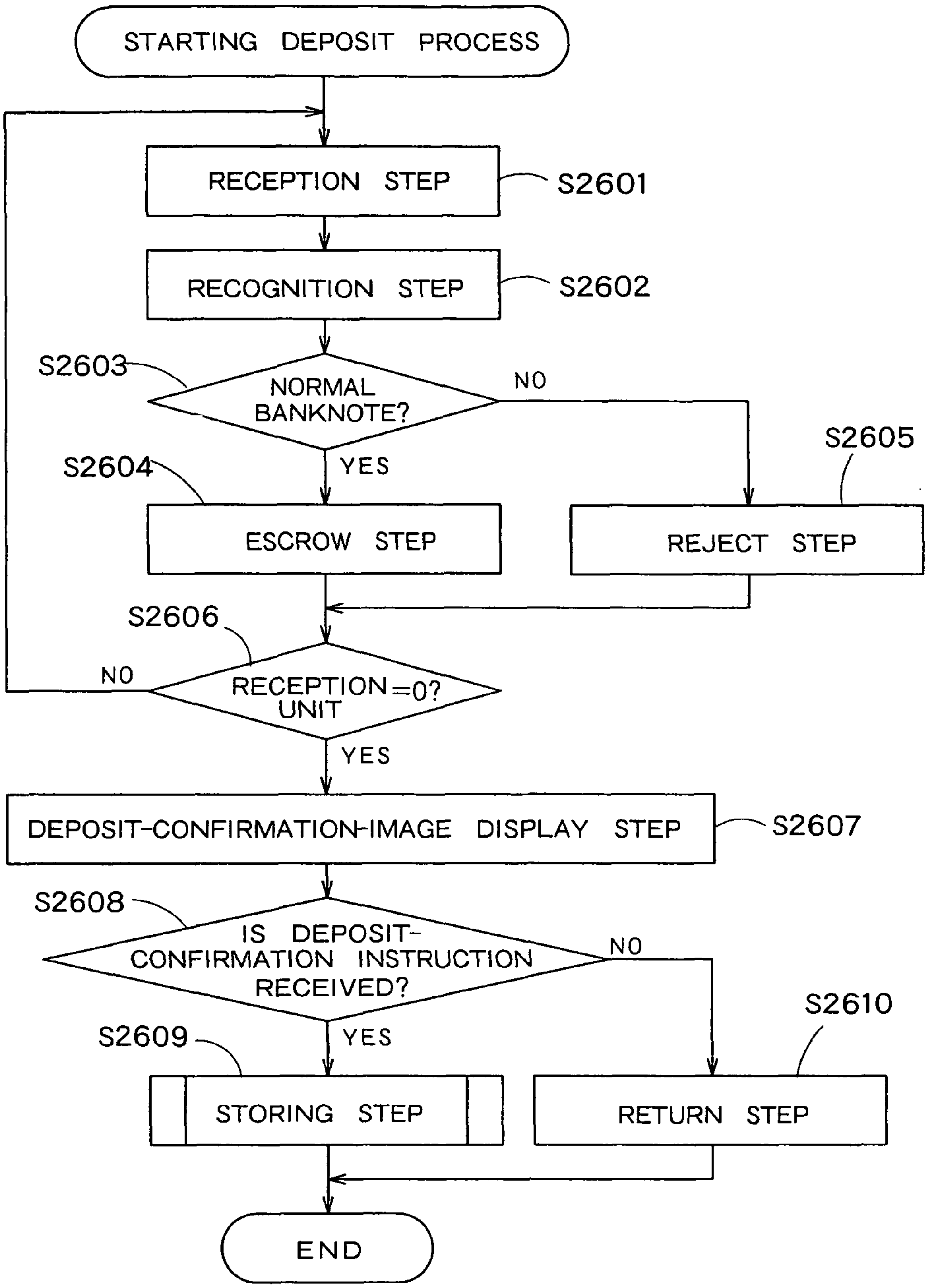
FIG. 26 is a flowchart showing a process procedure of a deposit process in the embodiment 6 according to the present invention.

FIG. 26 is a flowchart showing a process procedure of a deposit process in the embodiment 6 according to the present invention.

At first, as shown in FIG. 26, a reception step (S2601) is performed. In the reception step (S2601), the reception unit 2011 receives the put-in banknotes inside the banknote handling system 2010.

Next, a recognition step (S2602) is performed. In the recognition step (S2602), the recognition unit 2012 recognizes each of the banknotes that have been received by the reception unit 2011 at the reception step (S2601), and sends the recognition result to the control unit 2102. At this time, the control unit 2102 judges each of the banknotes as a "normal banknote" or a "reject banknote" based on the recognition result. In addition, the control unit 2102 writes in the storage unit 2101 as the recognition data 2101B the number of "normal banknotes" for each denomination or the reject factor of the "reject banknote".

When a "normal banknote" is judged by the control unit 2102 (S2603-YES), an escrow step (S2604) is performed. In the escrow step (S2604), the control unit 2102 causes the banknote judged as the "normal banknote" to be escrowed in the escrow unit 2017. At this time, the control unit 2102 writes in the storage unit 2101 escrow data 2101C including amount-of-money data of the escrow unit 2017, based on the recognition data 2101B.

On the other hand, when a "reject banknote" is judged by the control unit 2102 (S2603-NO), a reject step (S2605) is performed. In the reject step (S2605), the control unit 2102 causes the banknote judged as the "reject banknote" to be stacked in the system-outside reject unit 2014.

The steps S2601 to S2605 are repeatedly performed until the banknotes that have been put in the reception unit 2011 finish going away therefrom (S2606-NO).

When the banknotes that have been put in the reception unit 2011 finish going away therefrom (S2606-YES), a deposit-confirmation-image display step (S2607) is performed. In the deposit-confirmation-image display step (S2607), the control unit 2102 causes the display unit 2104 to display a deposit-confirmation image including a message representing the number of banknotes that have been escrowed in the escrow unit 2017 and a message promoting a deposit confirmation instruction for fixing the process contents of the deposit process.

When a deposit confirmation instruction is received by the operation unit 2151 (S2608-YES), a storing process (S2609) is performed.

Figure 27:
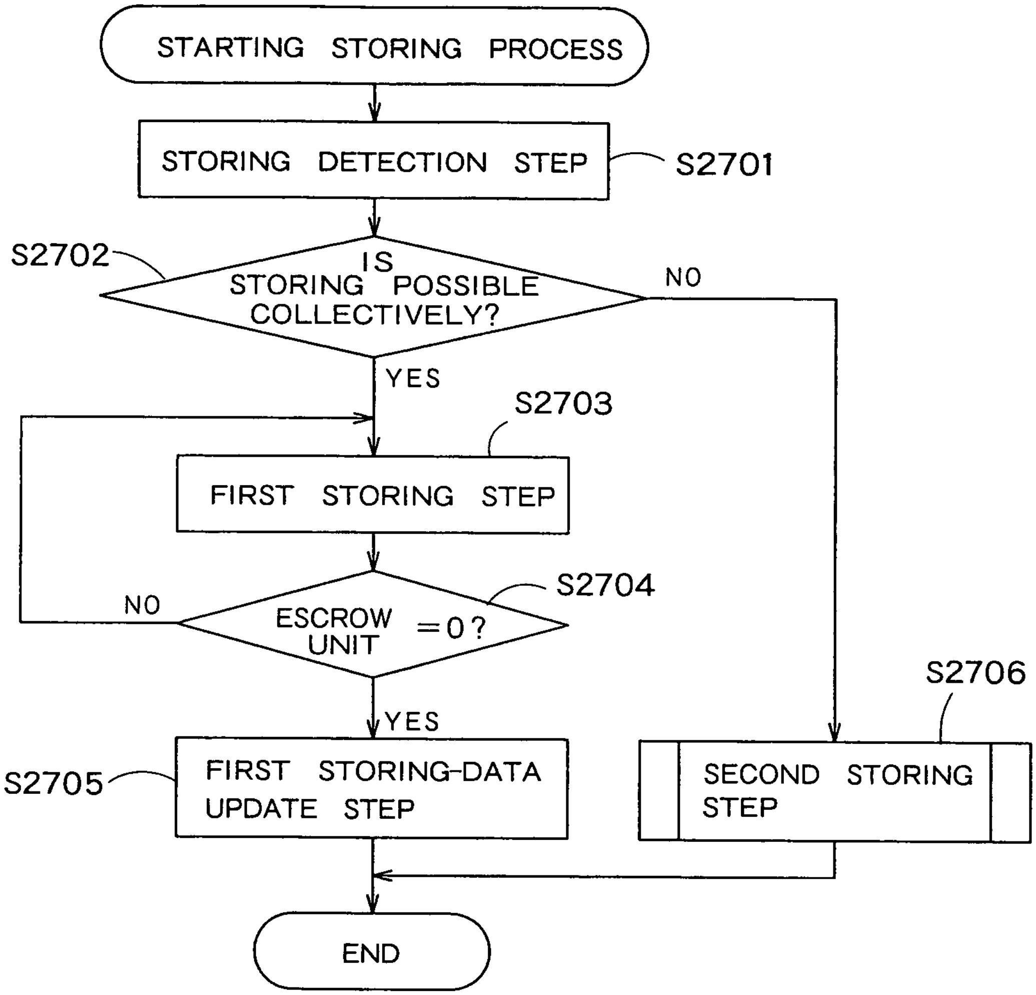
FIG. 27 is a flowchart showing a process procedure of a storing process (S2609 of FIG. 26) in the embodiment 6 according to the present invention.

FIG. 27 is a flowchart showing a process procedure of the storing process (S2609 of FIG. 26) in the embodiment 6 according to the present invention.

As shown in FIG. 27, at first, a storing detection step (S2701) is performed. In the storing detection step (S2701), the storing detection unit 2103 detects the respective numbers of the respective banknotes that have been stored in the respective cassettes 2131 to 2133, and sends the detection results to the control unit 2102. At this time, the control unit 2102 calculates the respective amounts of free space in the respective cassettes 2131 to 2133 based on the detection results sent from the storing detection unit 2103.

When the minimum value among the amounts of free space of the cassettes 2131 to 2133 calculated at the storing detection step (S2701) is greater than the value of the escrow data 2101C (i.e., when the entire storing into any of the cassettes 2131 to 2133 is possible) (S2702-YES), a first storing step (S2703) is performed. In the first storing step (S2703), the control unit 2102 causes the banknotes fed out from the escrow unit 2017 to be stored in any of the cassettes 2131 to 2133. The first storing step (S2703) is repeatedly performed until the banknotes that have been escrowed in the escrow unit 2017 finish being fed out therefrom (S2704-NO).

When the banknotes that have been escrowed in the escrow unit 2017 finish being fed out therefrom (S2704-YES), a first storing-data update step (S2705) is performed. In the first storing-data update step (S2705), the control unit 2102 calculates the sum of the value of the storing data 2101D corresponding to any of the cassettes 2131 to 2133 into which the banknotes have been stored at the first storing step (S2703) and the value of the escrow data 2101C, and thereby updates the value of the storing data 2101D. Then, the control unit 2102 clears the escrow data 2101C.

On the other hand, when the minimum value among the amounts of free space of the cassettes 2131 to 2133 calculated at the storing detection step (S2701) is smaller than the value of the escrow data 2101C (i.e., when the entire storing into any of the cassettes 2131 to 2133 is impossible) (S2702-NO), a second storing process (S2706) is performed.

In the embodiment 6, the transport path of the first storing step (S2703) may be a transport path through the recognition unit 2012 or another transport path not through the recognition unit 2012. When the transport step goes through the recognition unit 2012, the recognition process may be performed, or may be omitted. Even when the recognition process is performed by the recognition unit 2012, the recognition result may be neglected at the first storing-data update step (S2705).

Figure 28:
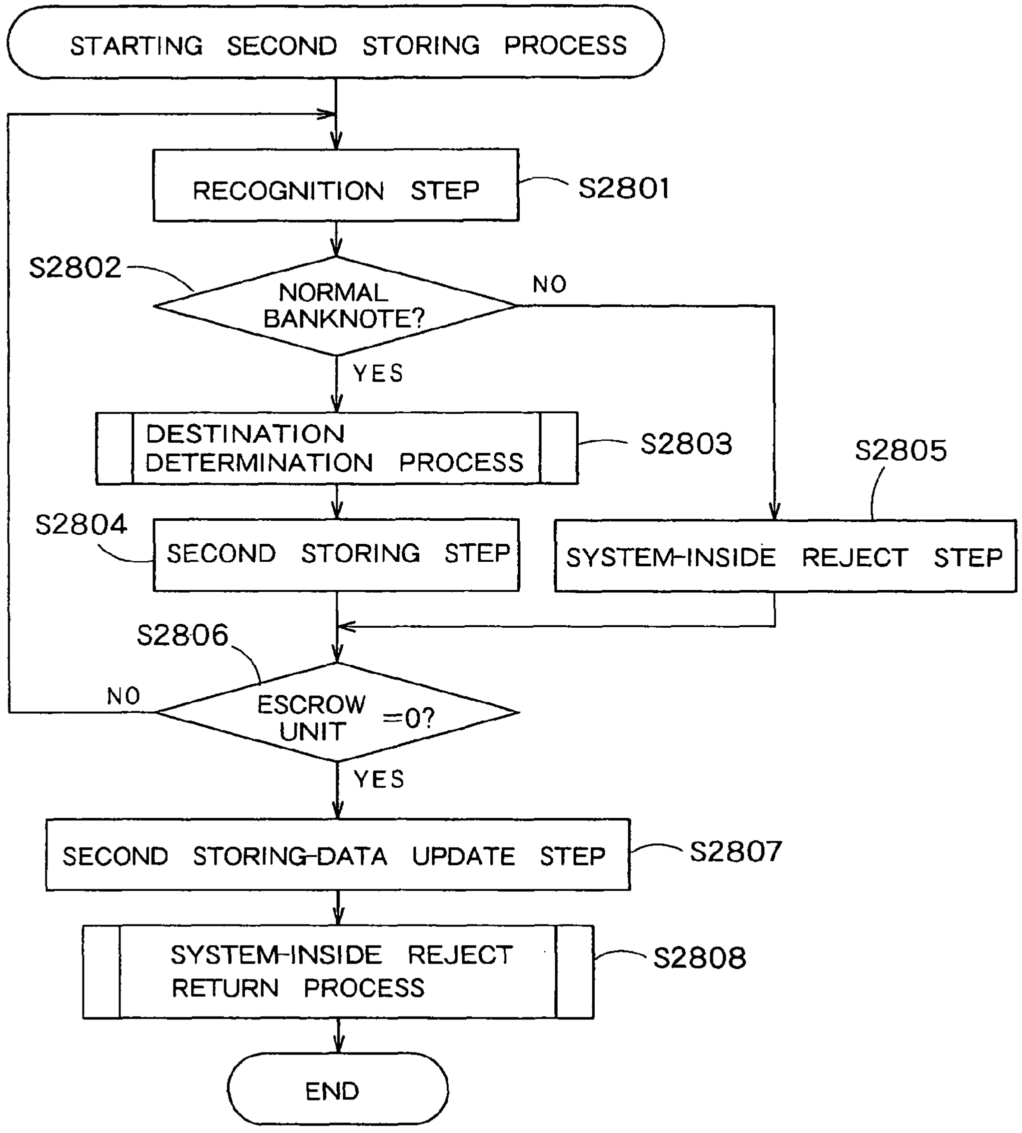
FIG. 28 is a flowchart showing a process procedure of a second storing process (S2706 of FIG. 27) in the embodiment 6 according to the present invention.

FIG. 28 is a flowchart showing a process procedure of the second storing process (S2706 of FIG. 27) in the embodiment 6 according to the present invention.

As shown in FIG. 28, at first, a recognition step (S2801) is performed. In the recognition step (S2801), the recognition unit 2012 recognizes each of the banknotes that have been fed out from the escrow unit 2017, and sends the recognition result to the control unit 2102. At this time, the control unit 2102 judges each of the banknotes as a “normal banknote” or a “reject banknote” based on the recognition result. In addition, the control unit 2102 writes in the storage unit 2101 as the recognition data 2101B the number of “normal banknotes” for each denomination or the reject factor of the “reject banknote”.

When a “normal banknote” is judged by the control unit 2102 (S2802-YES), a destination determination process (S2803) is performed.

FIG. 29 is a flowchart showing a process procedure of the destination determination process (S2803 of FIG. 28) in the embodiment 6 according to the present invention.

As shown in FIG. 29, when there is an amount of free space in a cassette 2013*n* of the storing unit 2013 (n is a positive natural number; 1≦n≦the number of cassettes; the initial value of n is 1) (S2901-YES), the control unit 2102 determines the cassette 2013*n* as a destination (S2902).

Next, a destination-data update step (S2903) is performed. In the destination-data update step (S2903), the control unit 2102 updates destination data 2101E (see FIG. 30) including the number of banknotes for each denomination to be stored in the cassette 2013*n* determined at the step S2902 as the destination, based on the recognition result of the recognition unit 2012 at the recognition step (S2801 of FIG. 28).

On the other hand, when there is no amount of free space in the cassette 2013*n* of the storing unit 2013 (S2901-NO), “n=n+1” is calculated (S2904) and the process returns to the step S2901.

The destination determination process (S2803 of FIG. 28) in the embodiment 6 is finished after the step S2903.

As shown in FIG. 28, after the destination determination process (S2803), a second storing step (S2804) is performed. In the second storing step (S2804), the control unit 2102 causes the banknotes that have been escrowed in the escrow unit 2107 to be fed out and to be stored in any of the cassettes 2131 to 2133 determined as the destination at the step S2902 of FIG. 29.

On the other hand, when a “reject banknote” is judged by the control unit 2102 (S2802-NO), a system-inside reject step (S2805) is performed. In the system-inside reject step (S2805), the control unit 2102 causes the banknote judged as the “reject banknote” to be escrowed in the system-inside reject unit 2018.

The recognition step (S2801) to the system-inside reject step (S2805) are repeatedly performed until the banknotes that have been escrowed in the escrow unit 2017 finish being fed out therefrom (S2806-NO).

When the banknotes that have been escrowed in the escrow unit 2017 finish being fed out therefrom (S2806-YES), a second storing-data update step (S2807) is performed. In the second storing-data update step (S2807), the control unit 2102 calculates the sum of the value of the storing data 2101D of the determined one among the cassettes 2131 to 2133 and the value of the destination data 2101E updated at the destination-data update step (S2903 of FIG. 29), and thereby updates the value of the storing data 2101D. Then, the control unit 2102 subtracts the value of the destination data 2101E from the value of the escrow data 2101C, and writes the subtracted result in the storage unit 2101 as system-inside reject data 2101F (see FIG. 31) including amount-of-money data of the banknotes escrowed in the system-inside reject unit 2018. Then, the control unit 2102 clears the escrow data 2101C and the destination data 2101E.

Next, a system-inside reject return process (S2808) is performed.

Figure 32:
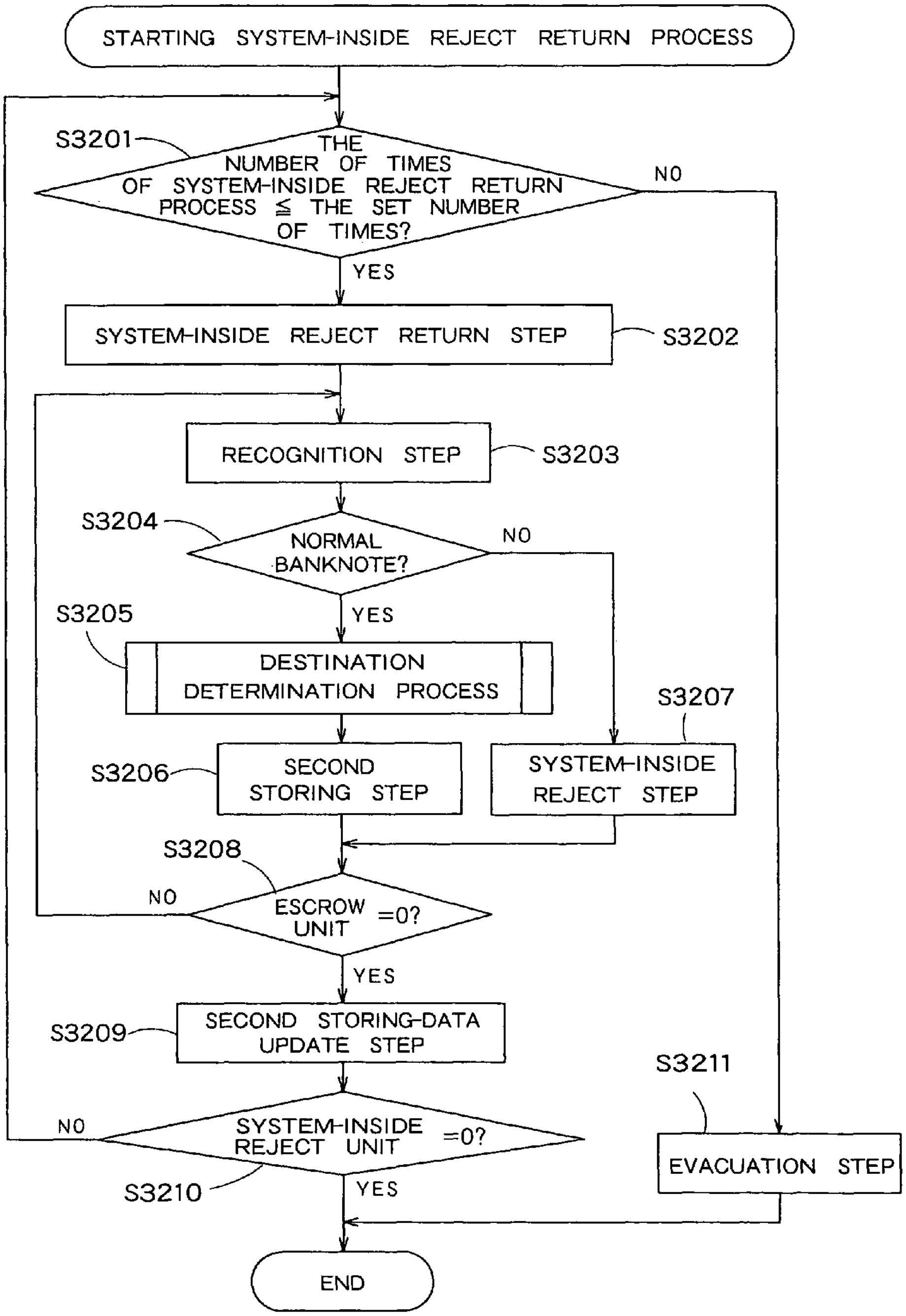
FIG. 32 is a flowchart showing a process procedure of a system-inside reject return process (S2808 of FIG. 28) in the embodiment 6 according to the present invention.

FIG. 32 is a flowchart showing a process procedure of the system-inside reject return process (S2808 of FIG. 28) in the embodiment 6 according to the present invention. The system-inside reject return process (S2808 of FIG. 28) is performed after the operation unit 2151 receives a number-of-times setting instruction from the operator and the control unit 2102 writes in the storage unit 2101 the set number of times based on the instruction.

As shown in FIG. 32, when the number of times the system-inside reject return process has been performed is not larger than the set number of times (S3201-YES), a system-inside reject return step (S3202) is performed. In the system-inside reject return step (S3202), the control unit 2102 causes all the banknotes escrowed in the system-inside reject unit 2018 to be fed out inside the banknote handling system 2010 and to be escrowed in the escrow unit 2017. At this time, the control unit 2102 writes in the storage unit 2101 the escrow data 2101C including the amount-of-money date of the banknotes escrowed in the escrow unit 2017, based on the recognition data 2101B. In addition, the escrow unit 2107 feeds out the banknotes that have been escrowed therein.

Next, a recognition step (S3203) is performed. In the recognition step (S3203), the recognition unit 2012 recognizes each of the banknotes that have been fed out from the escrow unit 2017 at the system-inside reject return step (S3202), and sends the recognition result to the control unit 2102. At this time, the control unit 2102 judges each of the banknotes as a “normal banknote” or a “reject banknote” based on the recognition result. In addition, the control unit 2102 writes in the storage unit 2101 as the recognition data 2101B the number of “normal banknotes” for each denomination or the reject factor of the “reject banknote”.

When a “normal banknote” is judged by the control unit 2102 (S3204-YES), a destination determination process (S3205) is performed. The destination determination process (S3205) is performed in accordance with the process procedure explained with reference to FIG. 29.

Then, a second storing step (S3206) is performed. In the second storing step (S3206), the control unit 2102 causes the banknote judged as the “normal banknote” to be stored in any of the cassettes 2131 to 2133, which has been determined as the destination at the step S2902 of FIG. 29.

On the other hand, when a “reject banknote” is judged by the control unit 2102 (S3204-NO), a system-inside reject step (S3207) is performed. In the system-inside reject step (S3207), the control unit 2102 causes the banknote judged as the “reject banknote” to be escrowed in the system-inside reject unit 2018.

The steps S3203 to S3207 are repeatedly performed until the banknotes that have been escrowed in the escrow unit 2017 finish being fed out therefrom (S3208-NO).

When the banknotes that have been escrowed in the escrow unit 2017 finish being fed out therefrom (S3208-YES), a second storing-data update step (S3209) is performed. The second storing-data update step (S3209) is performed in the same way as the second storing-data update step (S2807 of FIG. 28).

The steps S3201 to S3209 are repeatedly performed until the banknotes that have been escrowed in the system-inside reject unit 2018 finish being fed out therefrom (S3210-NO).

On the other hand, when the number of times the system-inside reject return process has been performed is larger than the set number of times (S3201-NO), an evacuation step (S3211) is performed. In the evacuation step (S3211), the control unit 2102 causes the entire banknotes escrowed in the system-inside reject unit 2018 to be stored in the removable cassette 2134 collectively.

The system-inside reject return process (S2808 of FIG. 28) in the embodiment 6 is finished when the banknotes that have been escrowed in the system-inside reject unit 2018 finish being fed out therefrom (S3210-YES), or after the evacuation step (S3211).

As shown in FIG. 28, the second storing process (S2706 of FIG. 27) in the embodiment 6 is finished after the system-inside reject return process (S2808).

On the other hand, as shown in FIG. 26, when a returning instruction is received by the operation unit 2151 (S2608-NO), a return step (S2610) is performed. In the return step (S2610), the control unit 2102 causes the banknotes that have been fed out from the escrow unit 2017 to be stacked in the reception unit 2011, and clears the escrow data 2101C.

The deposit process of the embodiment 6 (FIG. 26) is finished after the storing process (S2609) or the return step (S2611).

In the embodiment 6 of the present invention, the number of the cassettes 2131 to 2133 is three. However, the present invention is not limited thereto.

In the embodiment 6 of the present invention, the amount-of-money data (or amount of free space) of each of the cassettes 2131 to 2133 are calculated based on the number of banknotes. However, it is possible to measure the height of the banknotes stacked in each of the cassettes 2131 to 2133 and to calculate the amount-of-money data (or amount of free space) based on the measurement result.

In the embodiment 6 of the present invention, in the first storing step (S2703), the control unit 2102 can transport the banknotes that have been escrowed in the escrow unit 2017 to the storing unit 2013 through the recognition unit 2012, or not through the recognition unit 2012.

According to the embodiment 6, when the banknotes escrowed in the escrow unit 2017 can be stored in any of the cassettes 2131 to 2133 collectively, the recognition step by the recognition unit 2012 can be omitted and the storing data 2101D can be updated based on the escrow data 2101C. Thus, probability of occurrence of a reject factor can be reduced. Thus, a time required for all the banknotes escrowed in the escrow unit 2017 to be stored in the storing unit 2013 can be reduced.

In addition, according to the embodiment 6, the storage unit 2101 can store the storing data 2101D for each of the cassettes 2131 to 2133. Thus, the amount-of-money data of each of the cassettes 2131 to 2133 can be managed.

In addition, according to the embodiment 6, the system-inside reject unit 2018 is integral with the reception unit 2011. Thus, the banknote handling system 2010 can be provided in a compact manner.

In addition, according to the embodiment 6, the storage unit 2101 can store the escrow data 2101C and the destination data 2101E. Thus, the amount-of-money data of the system-inside reject unit 2018 can be managed.

The invention claimed is:

1. A banknote handling system comprising:

a reception unit configured to receive a banknote that has been put therein;

a recognition unit configured to recognize the banknote that has been received by the reception unit;

a storing unit having at least one first cassette configured to store or escrow the banknote that has been recognized by the recognition unit, and at least one second cassette configured to store the banknote that has been recognized by the recognition unit;

an operation unit configured to receive a deposit-confirmation instruction for the banknote that has been escrowed in the first cassette; and a control unit configured to cause the banknote that has been recognized by the recognition unit to be escrowed in the first cassette and to cause, when the deposit-confirmation instruction is received by the operation unit, the banknote that has been escrowed in the first cassette to be stored in the second cassette;

wherein the control unit is configured to cause the banknote that has been stored in the second cassette to be escrowed in the first cassette, to cause the banknote that has been escrowed in the first cassette to be recognized by the recognition unit, thereby carrying out a reconciliation process for the banknote, and to cause the banknote for which the reconciliation process has been finished to be stored again in the second cassette.

2. The banknote handling system according to claim 1, further comprising:

a storing detection unit configured to detect the number of banknotes in the second cassette;

wherein the control unit is configured to cause the banknote that has been escrowed in the first cassette to be stored in the same first cassette, when the number of banknotes in the second cassette detected by the storing detection unit is more than a predetermined number.

3. The banknote handling system according to claim 2, wherein the storing detection unit is configured to detect the number of banknotes stored in the first cassette, and the control unit is configured to calculate an amount of free space of the second cassette based on the number of banknotes in the second cassette detected by the storing detection unit, and to cause the banknote that has been escrowed in the first cassette to be stored in the second cassette when the number of banknotes in the first cassette detected by the storing detection unit is not more than the amount of free space of the second cassette.

4. The banknote handling system according to claim 1, further comprising:

a storing detection unit configured to detect the number of banknotes in the first cassette; and a reception detection unit configured to detect the number of banknotes that has been put in the reception unit;

wherein the control unit is configured to calculate an amount of free space of the first cassette based on the number of banknotes in the first cassette detected by the storing detection unit, and to cause the banknotes that has been put in the reception unit to be received in the reception unit when the number of banknotes in the reception unit detected by the reception detection unit is not more than the amount of free space of the first cassette.

5. The banknote handling system according to claim 1, wherein the maximum capacity of the first cassette is larger than the number of banknotes capable of being put in the reception unit.

6. The banknote handling system according to claim 1, wherein the storing unit includes a plurality of second cassettes, and the control unit is configured to cause the banknote that has been recognized by the recognition unit to be escrowed in the first cassette and to cause, when the deposit confirmation instruction is received by the operation unit, the banknote that has been escrowed in the first cassette to be stored in any of the plurality of second cassettes.

7. A banknote handling system comprising:

a reception unit configured to receive a banknote that has been put therein;

a recognition unit configured to recognize the banknote that has been received by the reception unit;

a storing unit having at least one first cassette configured to escrow the banknote that has been recognized by the recognition unit and to feed out therefrom the banknote that has been escrowed therein, and at least one second cassette configured to store the banknote that has been recognized by the recognition unit and to feed out therefrom the banknote that has been stored therein;

a transport path provided between the first cassette and the second cassette;

a transport-error detection unit configured to detect a transport error of a banknote on the transport path; and a control unit configured to control the second cassette so as to feed out the banknote stored therein to the transport path, to cause the banknote fed out from the second cassette without a transport error to be escrowed in the first cassette if the transport-error detection unit of the transport path does not detect a transport error, to control the first cassette so as to feed out the banknote escrowed therein, to cause the banknote to be recognized by the recognition unit, thereby carrying out a reconciliation process for the banknote, and to cause the banknote for which the reconciliation process has been finished to be stored again in the second cassette.

8. The banknote handling system according to claim 7, wherein a reject unit is provided for stacking banknotes of which a transport error has been detected by the transport-error detection unit, and the control unit is configured to control the second cassette so as to feed out the banknote stored therein to the transport path, and to cause the banknote fed out from the second cassette with a transport error being detected by the transport-error detection unit to be stacked in the reject unit if the transport-error detection unit of the transport path detects a transport error.

9. The banknote handling system according to claim 8, wherein the reject unit further includes a feeding mechanism configured to feed out the banknotes stacked therein, and the control unit is configured to control the reject unit so as to feed out the banknotes stacked therein, to perform a reconciliation process for the banknotes by causing the recognition unit to recognize the banknotes, and to cause the banknotes whose reconciliation process has been finished to be stored again in the second cassette.

10. The banknote handling system according to claim 7, wherein the transport-error detection unit is configured to detect at least one of a skewed state, a chained state, an overlapped state and a banknote-interval of the banknotes while the banknotes are transported.

11. The banknote handling system according to claim 10, wherein the transport-error detection unit is configured to detect a banknote-interval of the banknotes while the banknotes are transported, and the control unit is configured to control the second cassette so as to adjust the banknote-interval of the banknotes fed out from the second cassette when a transport error regarding the banknote-interval is detected by the transport-error detection unit.

12. The banknote handling system according to claim 7, further comprising:

an operation unit configured to receive a reconciliation instruction for the banknotes that have been stored in the second cassette;

wherein the control unit is configured to start the reconciliation process based on the reconciliation instruction received by the operation unit.

13. The banknote handling system according to claim 12, wherein the operation unit is configured to receive a deposit instruction for banknotes, and the control unit is configured to cause the reception unit to receive banknotes that have been put in the reception unit when a deposit instruction is received by the operation unit.

14. A banknote handling system comprising:

a reception unit configured to receive a banknote that has been put therein;

a recognition unit configured to recognize the banknote that has been received by the reception unit;

an escrow unit having an escrow mechanism configured to escrow the banknote that has been recognized by the recognition unit and a feeding mechanism configured to feed out the escrowed banknote;

an operation unit configured to receive a deposit-confirmation instruction for the banknote that has been escrowed in the escrow unit;

a storing unit having a plurality of cassettes configured to store the banknote fed out from the escrow unit;

a storage unit configured to store escrow data including amount-of-money data of the escrow unit and storing data including amount-of-money data of the storing unit; and a control unit configured to cause the banknote that has been recognized by the recognition unit to be escrowed in the escrow unit and to control the escrow unit so as to cause, when the deposit-confirmation instruction is received by the operation unit, the banknote that has been escrowed in the escrow unit to be fed out and to be stored in the plurality of second cassettes;

wherein the control unit is configured to update the storing data based on recognition result by the recognition unit for the banknote stored in the plurality of second cassettes, and the control unit is configured to cause banknotes fed out from the escrow unit to be recognized by the recognition unit and to be divided and stored in the plurality of cassettes respectively, when the deposit-confirmation instruction is received by the operation unit and the banknotes that have been escrowed in the escrow unit cannot be stored in any of the plurality of cassettes collectively.

15. A banknote handling system comprising:

a reception unit configured to receive a banknote that has been put therein;

a recognition unit configured to recognize the banknote that has been received by the reception unit;

an escrow unit having an escrow mechanism configured to escrow the banknote that has been recognized by the recognition unit and a feeding mechanism configured to feed out the escrowed banknote;

an operation unit configured to receive a deposit-confirmation instruction for the banknote that has been escrowed in the escrow unit;

a storing unit having a plurality of cassettes configured to store the banknote fed out from the escrow unit;

a storage unit configured to store escrow data including amount-of-money data of the escrow unit and storing data including amount-of-money data of the storing unit; and a control unit configured to cause the banknote that has been recognized by the recognition unit to be escrowed in the escrow unit and to control the escrow unit so as to cause, when the deposit-confirmation instruction is received by the operation unit, the banknote that has been escrowed in the escrow unit to be fed out and to be stored in the plurality of second cassettes;

wherein the control unit is configured to cause banknotes fed out from the escrow unit to be stored in any of the plurality of cassettes collectively, when the deposit-confirmation instruction is received by the operation unit and any of the plurality of cassettes is capable of collectively storing the banknotes that have been escrowed in the escrow unit.

16. The banknote handling system according to claim 14, wherein the storing data includes amount-of-money data of each of the plurality of cassettes of the storing unit.

17. The banknote handling system according to claim 16, wherein the control unit is configured to calculate an amount of free space of each of the plurality of cassettes based on the storing data and to cause the banknotes fed out from the escrow unit to be divided and stored in the plurality of cassettes respectively based on the amount of free space.

18. The banknote handling system according to claim 17, further comprising a system-inside reject unit having an escrow mechanism configured to escrow, as a reject banknote, a banknote that has been fed out from the escrow unit and whose reject factor has been recognized by the recognition unit, wherein the control unit is configured to cause the banknote whose reject factor has been recognized by the recognition unit to be escrowed in the system-inside reject unit as a reject banknote.

19. The banknote handling system according to claim 18, wherein the system-inside reject unit is provided integrally with the reception unit.

20. The banknote handling system according to claim 18, wherein the control unit is configured to calculate amount-of-money data of the system-inside reject unit based on the escrow data and recognition result by the recognition unit.

21. The banknote handling system according to claim 18, wherein the system-inside reject unit further includes a feeding mechanism configured to feed out the reject banknote, the storing unit further includes a removable cassette configured to store a predetermined reject banknote, and the control unit is configured to control the system-inside reject unit so as to cause the reject banknote escrowed in the system-inside reject unit to be fed out, to cause the banknote to be recognized again by the recognition unit, and to cause the banknote to be stored in the removable cassette as a reject banknote when the reject factor is recognized again.

22. The banknote handling system according to claim 21, wherein the control unit is configured to control the system-inside reject unit so as to cause the reject banknote escrowed in the system-inside reject unit to be fed out, to cause the banknote to be recognized again by the recognition unit, and to cause the banknote to be stored in the plurality of cassettes as a normal banknote when denomination is normally recognized.

23. The banknote handling system according to claim 18, wherein the system-inside reject unit further includes a feeding mechanism configured to feed out the reject banknote, the control unit is configured to control the system-inside reject unit so as to cause the reject banknote escrowed in the system-inside reject unit to be fed out, to cause the banknote to be recognized again by the recognition unit, and to cause the banknote to be stored in any of the plurality of cassettes as a normal banknote when denomination is normally recognized.

* * * * *